(12) United States Patent
Chang et al.

(10) Patent No.: US 8,160,006 B2
(45) Date of Patent: Apr. 17, 2012

(54) APPARATUS AND METHOD FOR PROVIDING RELAY SERVICE IN MULTI-HOP RELAY BROADBAND WIRELESS ACCESS COMMUNICATION SYSTEM

(75) Inventors: Young-Bin Chang, Anyang-si (KR); Chang-Yoon Oh, Yongin-si (KR); Taori Rakesh, Suwon-si (KR); Jae-Weon Cho, Suwon-si (KR); Hyoung-Kyu Lim, Seoul (KR); Sung-Jin Lee, Seoul (KR); Hyun-Jeong Kang, Seoul (KR); Eun-Taek Lim, Suwon-si (KR); Pan-Yuh Joo, Seoul (KR); Dong-Seek Park, Yongin-si (KR); Joon-Young Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1281 days.

(21) Appl. No.: 11/838,457

(22) Filed: Aug. 14, 2007

(65) Prior Publication Data
US 2008/0039011 A1     Feb. 14, 2008

(30) Foreign Application Priority Data

| Aug. 14, 2006 | (KR) | 10-2006-0076904 |
| Oct. 20, 2006 | (KR) | 10-2006-0102585 |
| Oct. 31, 2006 | (KR) | 10-2006-0106932 |
| Nov. 7, 2006 | (KR) | 10-2006-0109700 |

(51) Int. Cl.
*H04W 4/00* (2009.01)

(52) U.S. Cl. ..................................................... 370/329
(58) Field of Classification Search .......... 370/206–208, 370/312, 313, 328–339, 400–401, 468–474
See application file for complete search history.

(56) References Cited

U.S. PATENT DOCUMENTS

| 7,796,546 | B2 * | 9/2010 | Lee et al. ............... 370/315 |
| 2007/0081483 | A1 * | 4/2007 | Jang et al. ............... 370/315 |
| 2007/0104223 | A1 * | 5/2007 | Lee et al. ............... 370/470 |

(Continued)

FOREIGN PATENT DOCUMENTS

DE    103 47 231    5/2005

(Continued)

OTHER PUBLICATIONS

Oh et al, Proposed Frame Structure and Relay Region Indicator, IEEE S80216j-06_256, 26 pages, 2006.*

(Continued)

*Primary Examiner* — Frank Duong
(74) *Attorney, Agent, or Firm* — The Farrell Law Firm, P.C.

(57) ABSTRACT

Provided is an apparatus and method for providing a synchronous relay service in a multi-hop relay BWA communication system. In the method, a BS-MS link subframe and an RS-MS link subframe are configured for a first section of a subframe in an $i^{th}$ frame. At least one of a BS-RS link subframe, an RS-RS link subframe and an RS-MS link subframe is configured for a second section of a subframe in the $i^{th}$ frame. The BS-MS link subframe and the RS-MS link subframe are configured for a first section of a subframe in an $(i+1)^{th}$ frame. At least one of the BS-RS link subframe, the RS-RS link subframe and the RS-MS link subframe is configured for a second section of a subframe in the $(i+1)^{th}$ frame.

14 Claims, 28 Drawing Sheets

U.S. PATENT DOCUMENTS

2008/0031180 A1* 2/2008 Hsieh et al. .................. 370/315

FOREIGN PATENT DOCUMENTS

KR 1020030057467 7/2003

OTHER PUBLICATIONS

Comstock et al, A Flexible Multi-hop Frame Structure for IEEE 802.16j, IEEE C802.16j-06/163r2, 11 pages, 2006.*
Ren et al, A Recommendation on PMPMode Compatible Frame Structure, IEEE C802.16mmr-05/005r2, 7 pages, 2005.*
Ren et al, Recommendation on PMP Mode Compatible TDD Frame Structures, IEEE C802.16mmr-05/027r1, 16 pages, 2005.*
Xiaobing Leng et al., "A Frame Structure for Mobile Multi-hop Relay with Different Carrier Frequencies", Nov. 11, 2005.
Haruki Izumikawa et al., "Map Multiplexing in IEEE 802.16 Mobile Multi-Hop Relay", 17th Annual IEEE Symposium on Personal, Indoor and Mobile Radio Communications, Sep. 1, 2006.

* cited by examiner

APPARATUS AND METHOD FOR PROVIDING RELAY SERVICE IN MULTI-HOP RELAY BROADBAND WIRELESS ACCESS COMMUNICATION SYSTEM

PRIORITY

This application claims priority under 35 U.S.C. §119 to an application filed in the Korean Intellectual Property Office on Aug. 14, 2006 and allocated Serial No. 2006-0076904, an application filed in the Korean Intellectual Property Office on Oct. 20, 2006 and allocated Serial No. 2006-102585, an application filed in the Korean Intellectual Property Office on Oct. 31, 2006 and allocated Serial No. 2006-106932, and an application filed in the Korean Intellectual Property Office on Nov. 7, 2006 and allocated Serial No. 2006-109700 the contents of which are incorporated herein by reference.

BACKGROUND OF THE INVENTION

1. Field of the Invention

The present invention relates generally to a multi-hop relay Broadband Wireless Access (BWA) communication system, and in particular, to an apparatus and method for providing a synchronous relay service in a multi-hop relay BWA communication system.

2. Description of the Related Art

In fourth-Generation (4G) communication systems, radii of cells are reduced to achieve a higher transmission rate and accommodate a greater number of calls. Centralized network design with conventional technology is not viable for the 4G mobile communication systems. Thus, the 4G mobile communication systems should allow for distributed control and implementations and actively adjust to environment changes, such as addition of a new Base Station (BS). In order to accomplish this, the 4G mobile communication systems should use a self-configurable wireless network.

For realtime deployment of a self-configurable wireless network, technologies used for an ad-hoc network are introduced to the 4G mobile communication systems. A major example is a multi-hop relay network configured by introducing a multi-hop relay scheme used for the ad-hoc network to a cellular network using fixed BSs.

Since communications are performed between a BS and a Mobile Station (MS) via a direct link, a highly reliable radio communication link can be easily established between the BS and the MS in the cellular network. However, the fixedness of BSs impedes flexible wireless network configuration, which makes it difficult to provide efficient services in a radio environment that experiences a fluctuating traffic distribution and a great change in the number of calls.

To avert this problem, a relay scheme is adopted in which data is conveyed through multiple hops via neighbor MSs or neighbor Relay Stations (RSs). A multi-hop relay scheme facilitates fast network reconfiguration adaptive to an environmental change and renders an overall wireless network operation efficient. Also, the multi-hop relay scheme can provide a better-quality radio channel to an MS by installing an RS between the BS and the MS and thus establishing a multi-hop relay path via the RS. In addition, the multi-hop relay scheme can expand cell coverage because it can provide high-speed data channels to MSs in a cell boundary area where channel conditions from the BS are poor.

FIG. 1 is a diagram illustrating the configuration of a wireless communication system using a typical relay scheme.

Referring to FIG. 1, an MS 110 (MS1) within a service area (i.e., coverage area) 101 of a BS 100 communicates with the BS 100 via a direct link. An MS 120 (MS2), which is located outside the service area 101 of the BS 100 and thus is in poor channel condition, communicates with the BS 100 via a relay link of an RS 130.

Using the RS 130, the BS 100 can communicate with MSs that are in poor channel condition because they are located outside the service area 101 of the BS 100 or in a shadowing area experiencing severe shielding effects of buildings.

FIG. 2 is a diagram illustrating a frame structure for a wireless communication system using a conventional relay scheme.

Referring to FIG. 2, the frame is divided into a DownLink (DL) subframe 200 and an UpLink (UL) subframe 230.

The DL subframe 200 is divided into a first section 210 for providing a service from a BS via a direct link and a second section 220 for providing a service from an RS via a relay link.

For the first section 210, the BS configures a BS DL subframe that will be transmitted to the RS or an MS connected via a direct link The BS DL subframe a sync channel (preamble) 211, a control channel 213, and a DL burst 215.

For the second section 220, the RS configures an RS DL subframe that will be transmitted to a subordinate RS or an MS connected via a relay link. The RS DL subframe an RS sync channel (RS preamble) 221, a control channel 223, and a DL burst 225.

The UL subframe 230 is divided into a first section 231 for communication with a BS via a direct link and a second section 233 for communication with an RS via a relay link.

For the first section 231, a BS UL subframe is configured to transmit control information and traffic to the BS from the RS or an MS connected through a direct link to the BS. For the second section 233, an RS UL subframe is configured to transmit control information and traffic to the RS from an MS connected via a relay link.

A guard interval of a Transmit/receive Transition Gap (TTG) 240 exists between the DL subframe 200 and the UL subframe 230. Also, a guard interval of a Receive/transmit Transition Gap (RTG) 250 exists between the DL subframe 200 and the UL subframe of the previous frame.

When communications are performed using the frames illustrated in FIG. 2 MSs have different frame timings depending on the service-providing entities (e.g., a BS or an RS). For example, for the downlink, an MS receiving a service from the BS receives a service through the BS DL subframe of the first section 210. For the uplink, an MS receiving a service from the RS receives a service through the RS DL subframe of the second section 220.

As described above, when the MSs receiving services from the BS or the RS operate asynchronously, the synchronization and handover of each MS are difficult to implement.

SUMMARY OF THE INVENTION

An object of the present invention is to substantially solve at least the above problems and/or disadvantages and to provide at least the advantages below. Accordingly, an object of the present invention is to provide an apparatus and method for providing a relay service in a multi-hop relay BWA communication system.

Another object of the present invention is to provide an apparatus and method for providing a synchronous relay service in a multi-hop relay BWA communication system.

Still another object of the present invention is to provide an apparatus and method for providing a synchronous relay service in a multi-hop relay BWA communication system by using two consecutive frames.

Still another object of the present invention is to provide an apparatus and method for providing a synchronized channel to MSs and RSs in a multi-hop relay BWA communication system.

Still another object of the present invention is to provide an apparatus and method for performing communications between an even-hop RS and an odd-hop RS in a multi-hop relay BWA communication system.

Still another object of the present invention is to provide an apparatus and method for performing communications between even-hop RSs or between odd-hop RSs in a multi-hop relay BWA communication system.

According to one aspect of the present invention, a method for configuring a frame for providing a relay service in a wireless communication system includes configuring a BS-MS link subframe and an RS-MS link subframe for a first section of a subframe in an $i^{th}$ frame: configuring at least one of a BS-RS link subframe, an RS-RS link subframe and an RS-MS link subframe for a second section of a subframe in the $i^{th}$ frame: configuring the BS-MS link subframe and the RS-MS link subframe for a first section of a subframe in an $(i+1)^{th}$ frame: and con figuring at least one of the BS-RS link subframe, the RS-RS link subframe and the RS-MS link subframe for a second section of a subframe in the $(i+1)^{th}$ frame.

According to another aspect of the present invention, a method for providing a relay service from a BS in a wireless communication system includes communicating with an MS within a service area for a first section of a subframe in an $i^{th}$ frame according to resource allocation information: communicating with a 1-hop RS for a second section of the subframe in the $i^{th}$ frame; and communicating with the MS for an $(i+1)^{th}$ frame.

According to still another aspect of the present invention a method for providing a relay service from an even-hop RS in a wireless communication system includes communicating with an MS within a service area for a first section of a subframe in an $i^{th}$ frame according to resource allocation information: communicating with a next odd-hop RS for a second section of the subframe in the $i^{th}$ frame; communicating with the MS for a first section of a subframe in an $(i+1)^{th}$ frame; and communicating with a previous odd-hop RS for a second section of the subframe in the $(i+1)^{th}$ frame.

According to still another aspect of the present invention, a method for providing a relay service from an odd-hop RS in a wireless communication system includes communicating with an MS within a service area for a first section of a subframe in an $i^{th}$ frame according to resource allocation information; communicating with a previous even-hop RS for a second section of the subframe in the $i^{th}$ frame: communicating with the MS for a first section of a subframe in an $(i+1)^{th}$ frame; and communicating with a next even-hop RS for a second section of the subframe in the $(i+1)^{th}$ frame.

According to still another aspect of the present invention, a method for providing a relay service from a terminal even-hop RS in a wireless communication system includes communicating with an MS within a service area for an $i^{th}$ frame according to resource allocation information; communicating with the MS for a first section of a subframe in an $(i+1)^{th}$ frame: and communicating with a previous-hop RS for a second section of the subframe in the $(i+1)^{th}$ frame.

According to still another aspect of the present invention, a method for providing a relay service from a terminal odd-hop RS in a wireless communication system includes communicating with an MS within a service area for a first section of a subframe in an $i^{th}$ frame according to resource allocation information; communicating with a previous-hop RS for a second section of the subframe in the $i^{th}$ frame; and communicating with the MS for an $(i+1)^{th}$ frame.

According to still another aspect of the present invention, a BS apparatus of a wireless communication system includes a timing controller for providing a timing signal for supporting a relay service using two consecutive frames in accordance with a frame configuring scheme, and a frame configurer for configuring a BS-MS link subframe for a first section of a subframe in an $i^{th}$ frame, a BS-1-hop RS link subframe for a second section of the subframe in the $i^{th}$ frame, and a BS-MS link subframe for an $(i+1)^{th}$ frame in accordance with the timing signal.

According to still another aspect of the present invention, an even-hop RS apparatus of a wireless communication system includes a timing controller for providing a timing signal for supporting a relay service using two consecutive frames in accordance with a frame configuring scheme: and a frame configurer for configuring an RS-MS link subframe for a first section of a subframe in an $i^{th}$ frame, an RS-next odd-hop RS link subframe for a second section of the subframe in the $i^{th}$ frame, an RS-MS link subframe for a first section of an $(i+1)^{th}$ frame, and an RS-previous odd-hop RS link subframe for a second section of the $(i+1)^{th}$ frame in accordance with the timing signal.

According to still another aspect of the present invention, an odd-hop RS apparatus of a wireless communication system includes a timing controller for providing a timing signal for supporting a relay service using two consecutive frames in accordance with a frame configuring scheme; and a frame configurer for configuring an RS-MS link subframe for a first section of a subframe in an $i^{th}$ frame, an RS-previous even-hop RS link subframe for a second section of the subframe in the $i^{th}$ frame, an RS-MS link subframe for a first section of an $(i+1)^{th}$ frame, and an RS-next even-hop RS link subframe for a second section of the $(i+1)^{th}$ frame in accordance with the timing signal.

According to still another aspect of the present invention, a terminal even-hop RS apparatus of a wireless communication system includes a timing controller for providing a timing signal for supporting a relay service using two consecutive frames in accordance with a frame configuring scheme; and a frame configurer for configuring an RS-MS link subframe for an $i^{th}$ frame, an RS-MS link subframe for a first section of a subframe in an $(i+1)^{th}$ frame, and an RS-previous-hop RS link subframe for a second section of the $(i+1)^{th}$ frame in accordance with the timing signal.

According to still another aspect of the present invention, a terminal odd-hop RS apparatus of a wireless communication system includes a timing controller for providing a timing signal for supporting a relay service using two consecutive frames in accordance with a frame configuring scheme: and a frame configurer for configuring an RS-MS link subframe for a first section of a subframe in an $i^{th}$ frame, an RS-previous-hop RS link subframe for a second section of the $i^{th}$ frame, and an RS-MS link subframe for an $(i+1)^{th}$ frame.

BRIEF DESCRIPTION OF THE DRAWINGS

The above and other objects features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention proposes techniques for providing a relay service synchronously from all service-providing entities (or stations) in a multi-hop relay BWA communication system.

According to embodiments of the present invention, the communication system uses two consecutive frames to synchronously provide a relay service from all service-providing entities. For example, the communication system provides a synchronous relay service using superframes each of which is includes two consecutive frames. The first/second frame of the superframe will be referred to as '$i^{th}$ frame'/'$(i+1)^{th}$ frame', where 'i' is an even or odd number representing a frame index.

Figure 1:
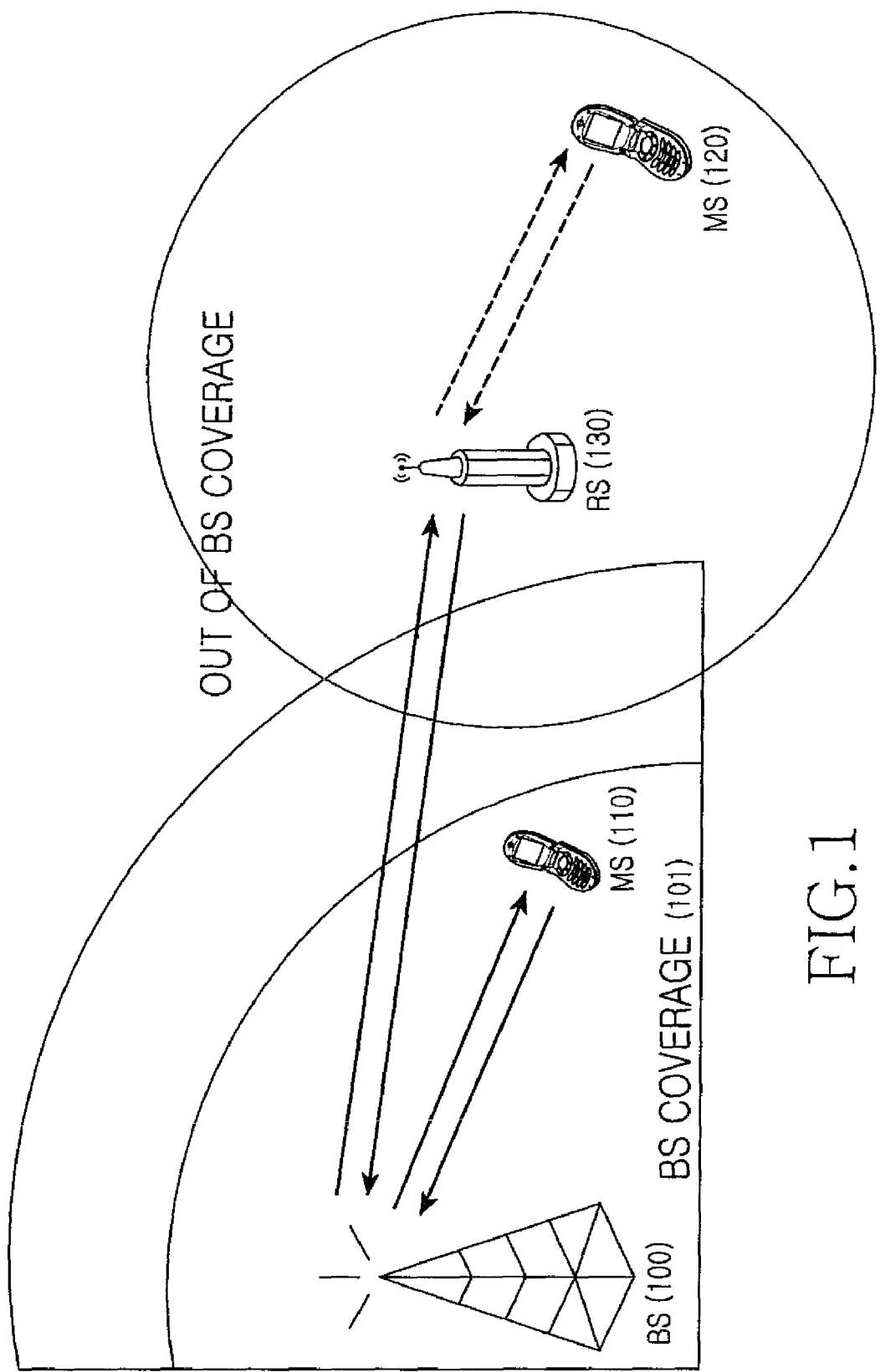
FIG. 1 is a diagram illustrating the configuration of a wireless communication system using a typical relay scheme.
Figure 2:
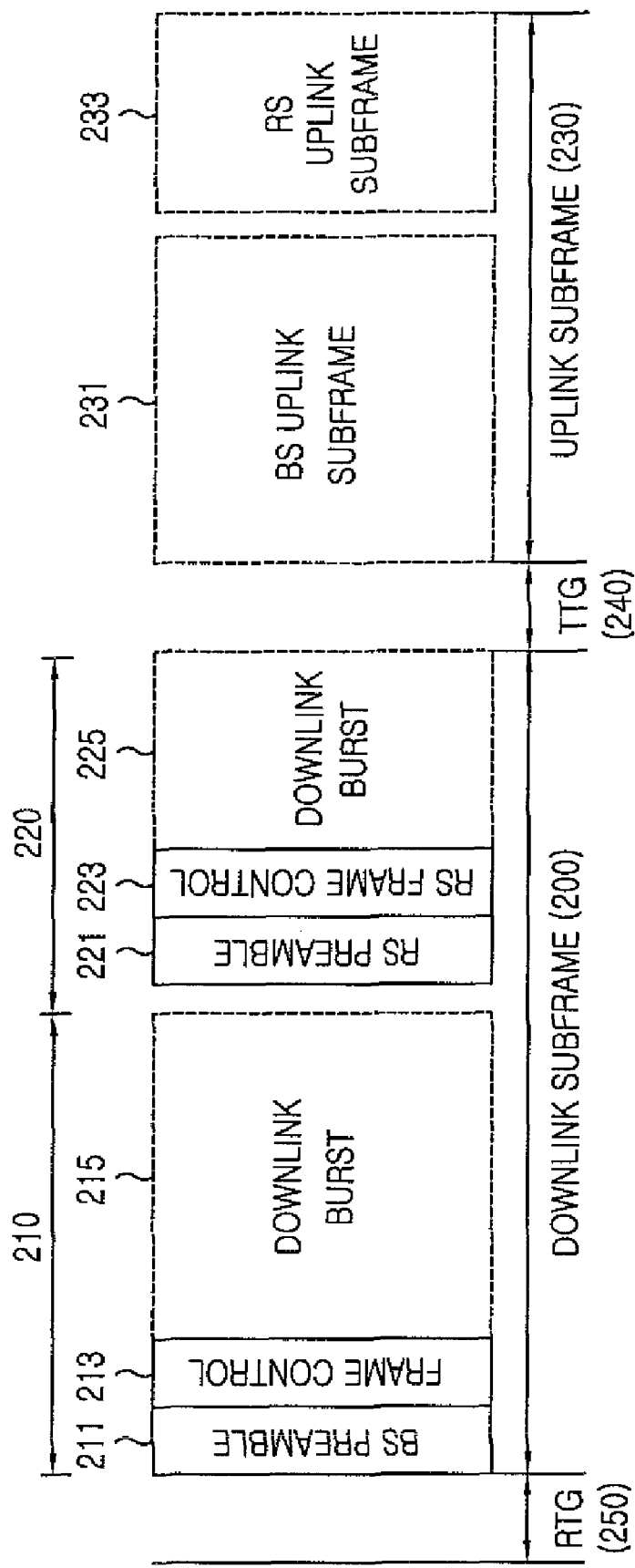
FIG. 2 is a diagram illustrating a frame structure for a wireless communication system using a conventional relay scheme.
Figure 3:
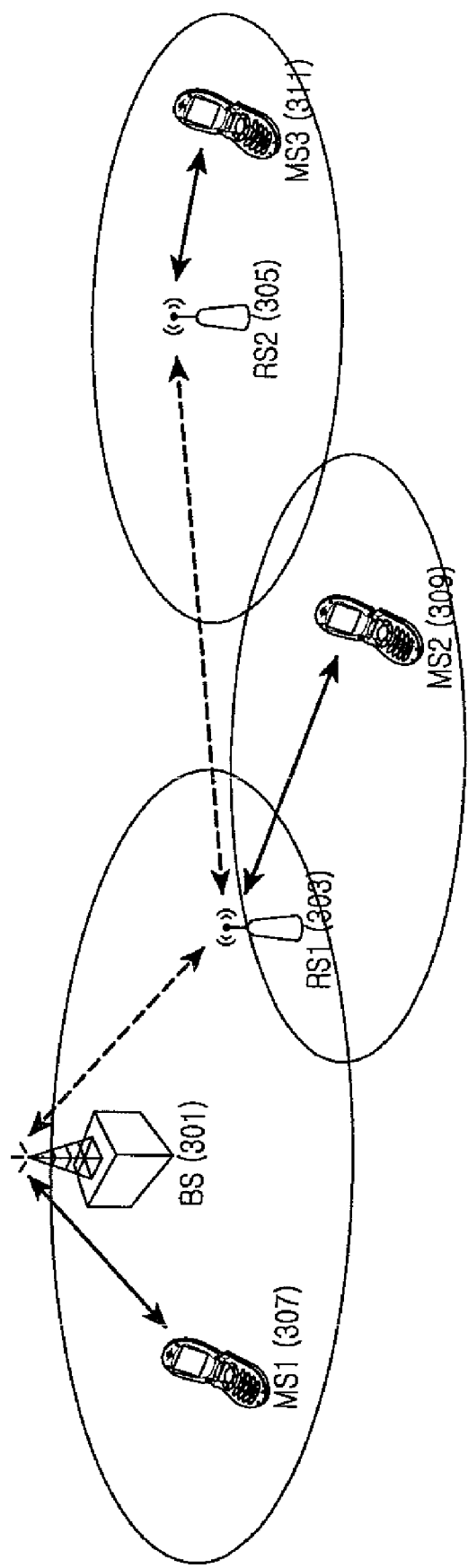
FIG. 3 is a diagram illustrating the configuration of a 3-hop relay BWA communication system according to an embodiment of the present invention.

FIG. 3 is a diagram illustrating the configuration of a 3-hop relay BWA communication system according to an embodiment of the present invention.

Referring to FIG. 3, an MS 307 (MS1) within a service area (i.e., coverage area) of a BS 301 communicates with the BS 301 via a direct link. MSs 309/311 (MS2/MS3), which are located outside the service area of the BS 301 and thus is in poor channel condition, communicate with the BS 301 via a relay link of RSs 303/305 (RS1/RS2).

The RS 303 relays communications between the BS 301 and the MS 309. Also, the RS 303 relays communications between the BS 301 and the RS 305 so that the RS 305 can provide a relay service to the MS 311.

The RS 305 relays communications between the BS 301 and the MS 311 via the RS 303.

Figure 4:
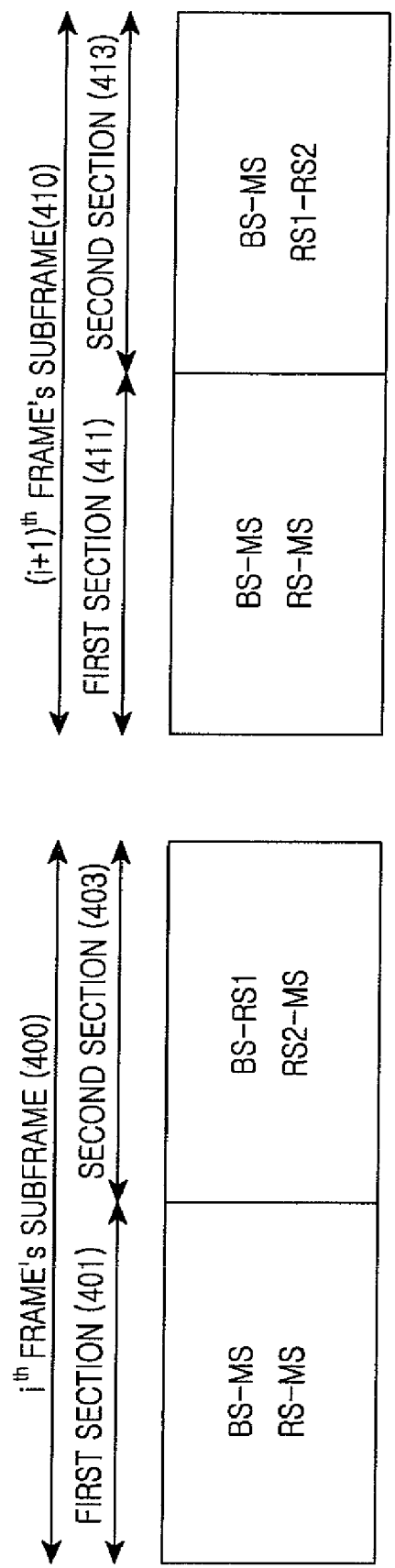
FIG. 4 is a diagram illustrating a subframe structure for the 3-hop relay BWA communication system according to an embodiment of the present invention.

In order to synchronously provide a relay service to the MSs from all service-providing stations, the 3-hop relay BWA communication system performs communications using subframes illustrated in FIG. 4. That is in the 3-hop relay BWA communication system, the BS and the RSs simultaneously transmit data to the MSs within their service areas using the subframes illustrated in FIG. 4.

FIG. 4 is a diagram illustrating a subframe structure for the 3-hop relay BWA communication system according to an embodiment of the present invention.

Referring to FIG. 4, a subframe 400/410 of the $i^{th}/(i+1)^{th}$ frame is divided into a first section 401/411 and a second section 403/413.

In the subframe 400 of the $i^{th}$ frame, the first section 401 includes a BS-MS link subframe, RS-MS link subframe. The RS-MS link subframe includes an RS1-MS link subframe, and an RS2-MS link subframe. Here, the link subframe indicates a resource allocation region.

The second section 403 includes a BS-RS1 link subframe and the RS2-MS link subframe. That is, both of the first and second sections 401 and 403 include the RS2-MS link subframe.

In the subframe 410 of the $(i+1)^{th}$ frame, the first section 411 includes a BS-MS link subframe, an RS1-MS link subframe, and an RS2-MS link subframe.

The second section 413 includes the BS-MS link subframe and an RS1-RS2 link subframe. That is, both of the first and second sections 411 and 413 include the BS-MS link subframe.

The subframes included in the first section 401/411 and the second section 403/413 may be multiplexed in a Space Division Multiplexing (SDM) scheme, a Frequency Division Multiplexing (FDM) scheme, or an Orthogonal Frequency Division Multiple Access (OFDMA) scheme.

Figure 5:
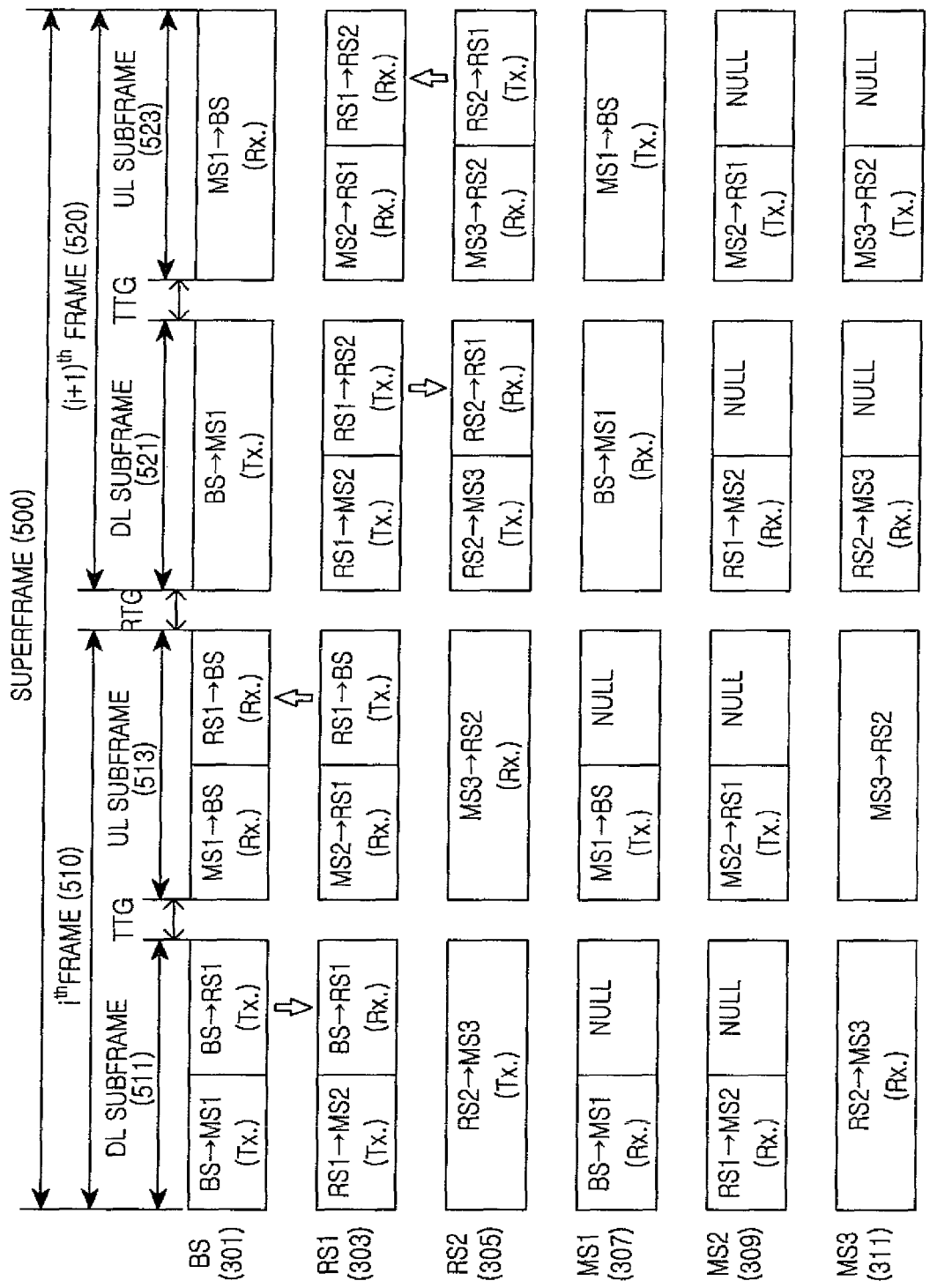
FIG. 5 is a diagram illustrating a frame structure for the 3-hop relay BWA communication system according to an embodiment of the present invention.

If the 3-hop relay BWA communication system performs communications using the subframes illustrated in FIG. 4, the BS, the RSs and the MSs may operate as illustrated in FIG. 5.

FIG. 5 is a diagram illustrating a frame structure for the 3-hop relay BWA communication system according to an embodiment of the present invention. The following description is made assuming that subframes are spatially multiplexed in first and second sections of an $i^{th}/(i+1)^{th}$ frame 510/520.

Referring to FIG. 5, the $i^{th}/(i+1)^{th}$ frame 510/520 of a superframe 500 is divided into a DL subframe 511/521 and a UL subframe 513/523 in accordance with a Time Division Duplex (TDD) scheme. Each of the DL subframe 511/521 and the UL subframe 513/523 is divided into a first section and a second section, in a manner illustrated in FIG. 4.

A guard interval of a Transmit/receive Transition Gap (TTG) exists between the DL subframe 511/521 and the UL subframe 513/523, and a guard interval of a Receive/transmit Transition Gap (RTG) exists between the $i^{th}$ frame 510 and the $(i+1)^{th}$ frame 520.

If a relay service is provided using the superframe 500, a BS 301 transmits DL data to an MS 307 (MS1) for the first section of the DL subframe 511 in the $i^{th}$ frame 510. Also, the BS 301 transmits DL data to an RS 303 (RS1) for the second section of the DL subframe 511.

Figure 15:
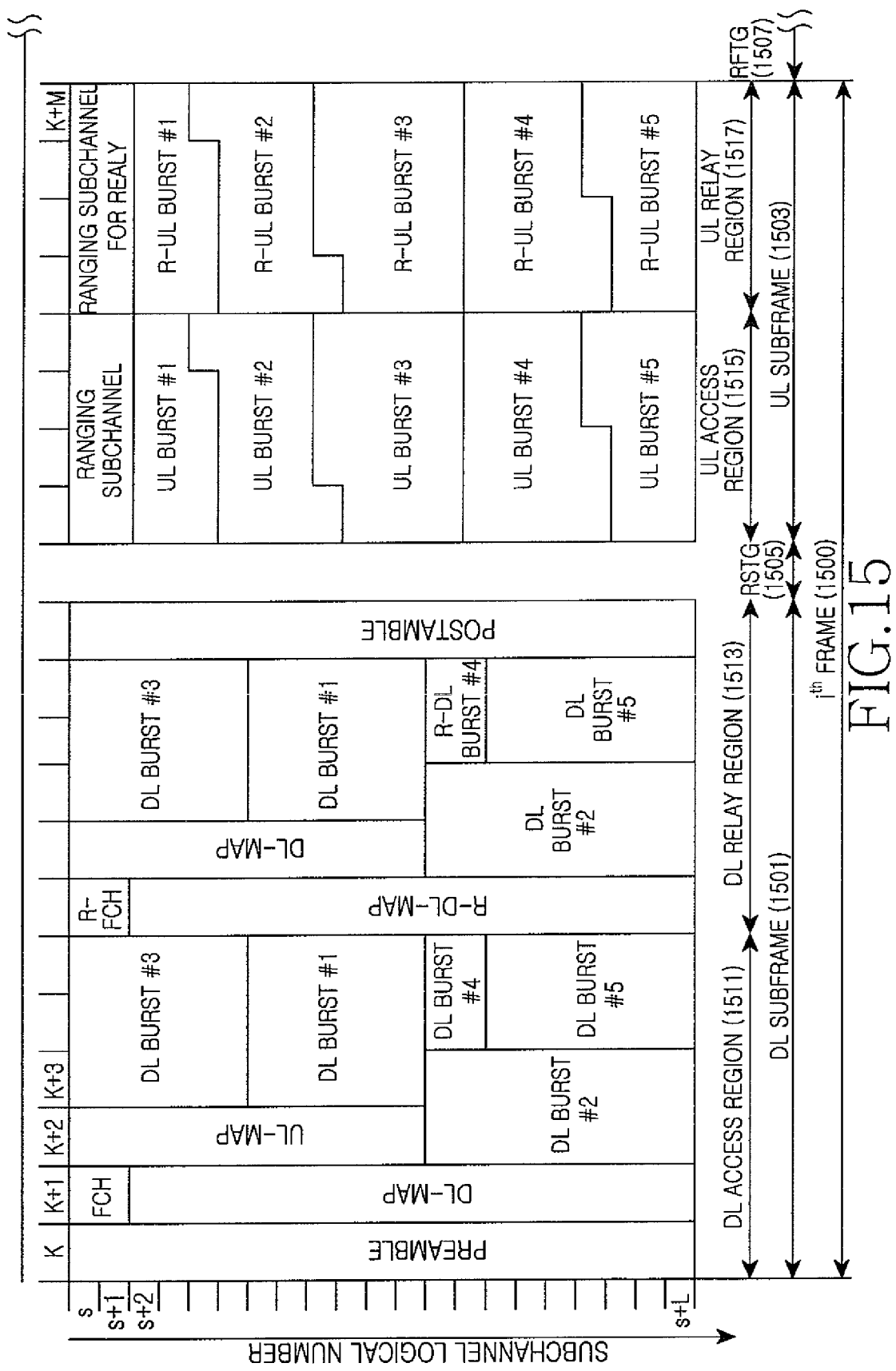
FIG. 15 is a diagram illustrating an $i^{th}$ frame structure for a BS in the multi-hop relay BWA communication system according to an embodiment of the present invention.

The BS 301 receives UL data from the MS 307 for the first section of the UL subframe 513, and receives UL data from the RS 303 for the second section of the UL subframe 513. If the $i^{th}$ flame 510 is the same as that in the Institute of Electrical and Electronics Engineers (IEEE) 802.16 standards, the BS 301 may perform communications using the $i^{th}$ frame illustrated in FIG. 15.

The BS 301 transmits DL data to the MS 307 for the DL subframe 521 in the $(i+1)^{th}$ frame 520, and receives UL data from the MS 307 for the UL subframe 523 in the $(i+1)^{th}$ frame 520. If the $(i+1)^{th}$ frame 520 is the same as that in the IEEE 802.16 standards, the BS 301 may perform communications using the $(i+1)^{th}$ frame illustrated in FIG. 16.

The RS 303 transmits DL data to an MS 309 (MS2) for the first section of the DL subframe 511 in the $i^{th}$ frame 510. Also, the RS 303 receives DL data from the BS 301 for the second section of the DL subframe 511.

Figure 19:
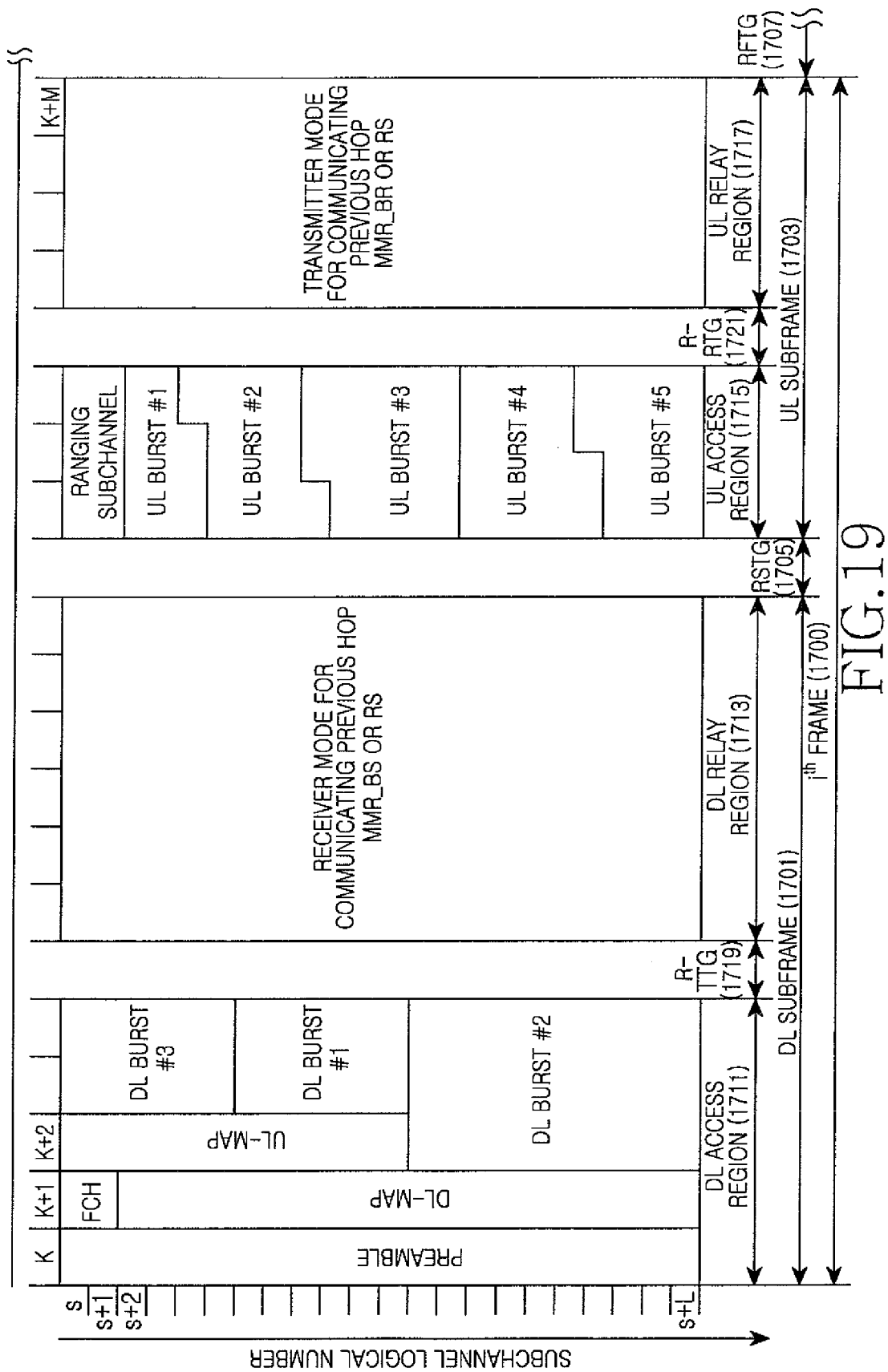
FIG. 19 is a diagram illustrating an $i^{th}$ frame structure for an odd-hop RS in the multi-hop relay BWA communication system according to an embodiment of the present invention.

The RS 303 receives UL data from the MS 309 for the first section of the UL subframe 513, and transmits UL data to the BS 301 for the second section of the UL subframe 513. If the $i^{th}$ frame 510 is the same as that in the 802.16 standards the RS 303 may perform communications using the $i^{th}$ frame illustrated in FIG. 19.

The RS 303 transmits DL data to the MS 309 for the first section of the DL subframe 521 in the $(i+1)^{th}$ frame 520, and transmits DL data to an RS 305 (RS2) for the second section of the DL subframe 521. That is, the RS 303 transmits the DL data, which has been received from the BS 301 for the second section of the DL subframe 511 in the $i^{th}$ frame 510, to the RS 305 for the second section of the DL subframe 521.

Figure 20:
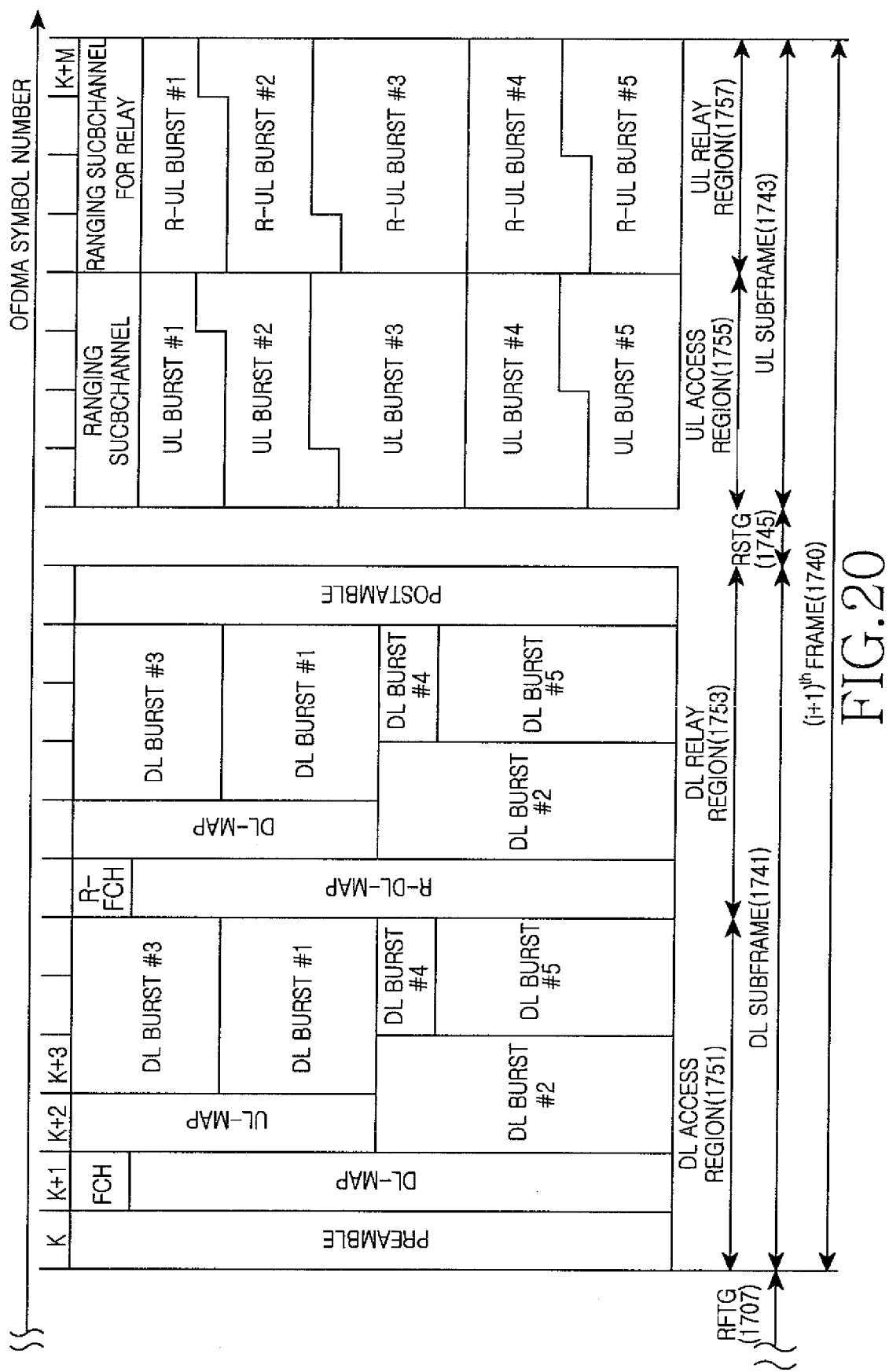
FIG. 20 is a diagram illustrating an $(i+1)^{th}$ frame structure for an odd-hop RS in the multi-hop relay BWA communication system according to an embodiment of the present invention.

The RS 303 receives UL data from the MS 309 for the first section of the UL subframe 523 in the $(i+1)^{th}$ frame 520, and receives UL data from the RS 305 for the second section of the UL subframe 523. That is, the RS 303 receives the UL data, which will be transmitted from an MS 311 (MS3) to the BS 301, from the RS 305 for the second section of the UL subframe 523. If the $(i+1)^{th}$ frame 520 is the same as that in the IEEE 802.16 standards, the RS 303 may perform communications using the $(i+1)^{th}$ frame illustrated in FIG. 20.

Figure 23:
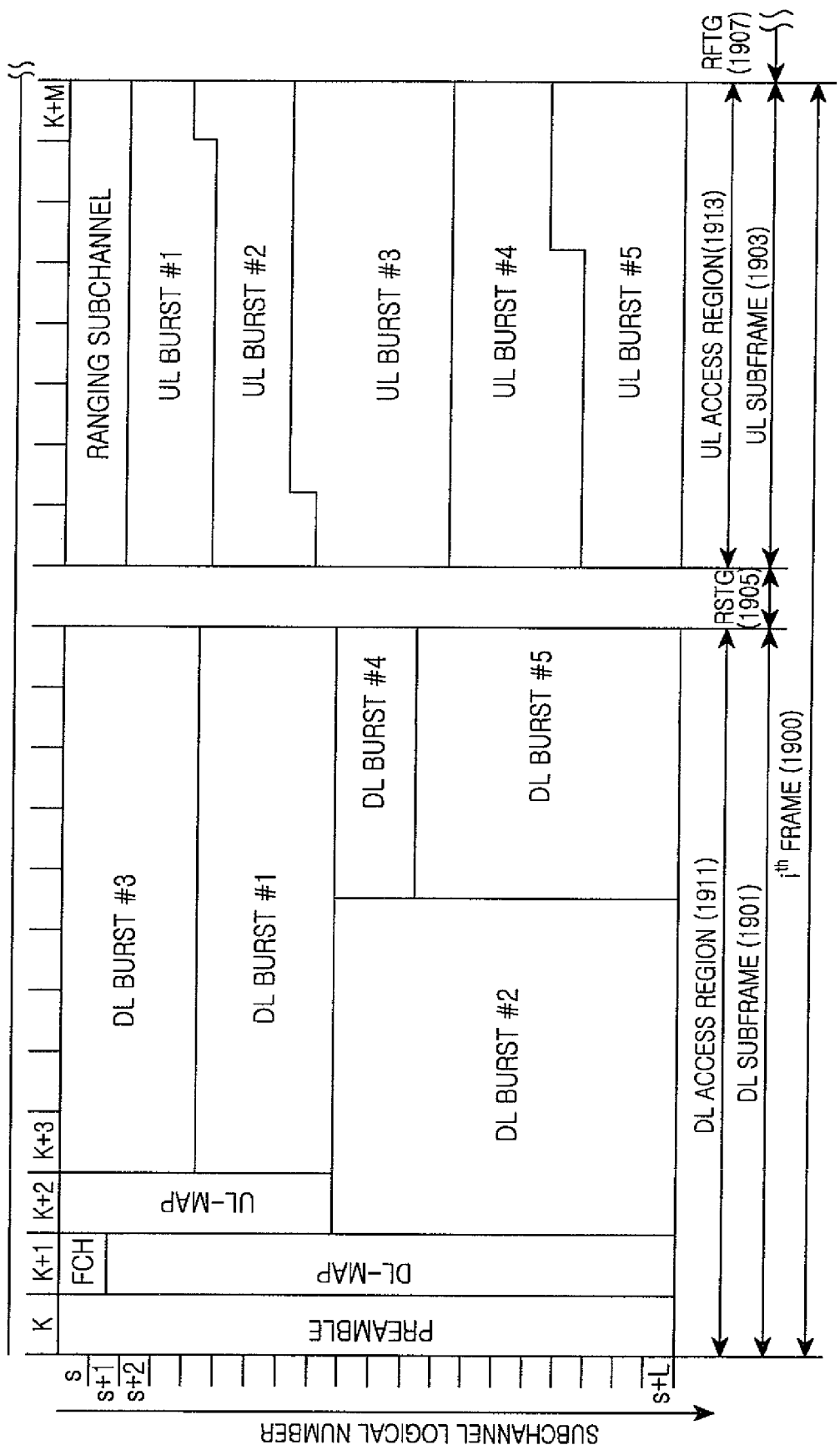
FIG. 23 is a diagram illustrating an $i^{th}$ frame structure for a terminal even-hop RS in the multi-hop relay BWA communication system according to an embodiment of the present invention.

The RS 305 transmits DL data to the MS 311 for the DL subframe 511 in the $i^{th}$ frame 510, and receives UL data from the MS 311 for the UL subframe 513 in the $i^{th}$ frame 510. If the $i^{th}$ frame 510 is the same as that in the IEEE 802.16 standards, the RS 305 may perform communications using the $i^{th}$ frame illustrated in FIG. 23.

The RS 305 transmits DL data to the MS 311 for the first section of the DL subframe 521 in the $(j+1)^{th}$ frame 520, and receives DL data from the RS 303 for the second section of the DL subframe 521.

Figure 24:
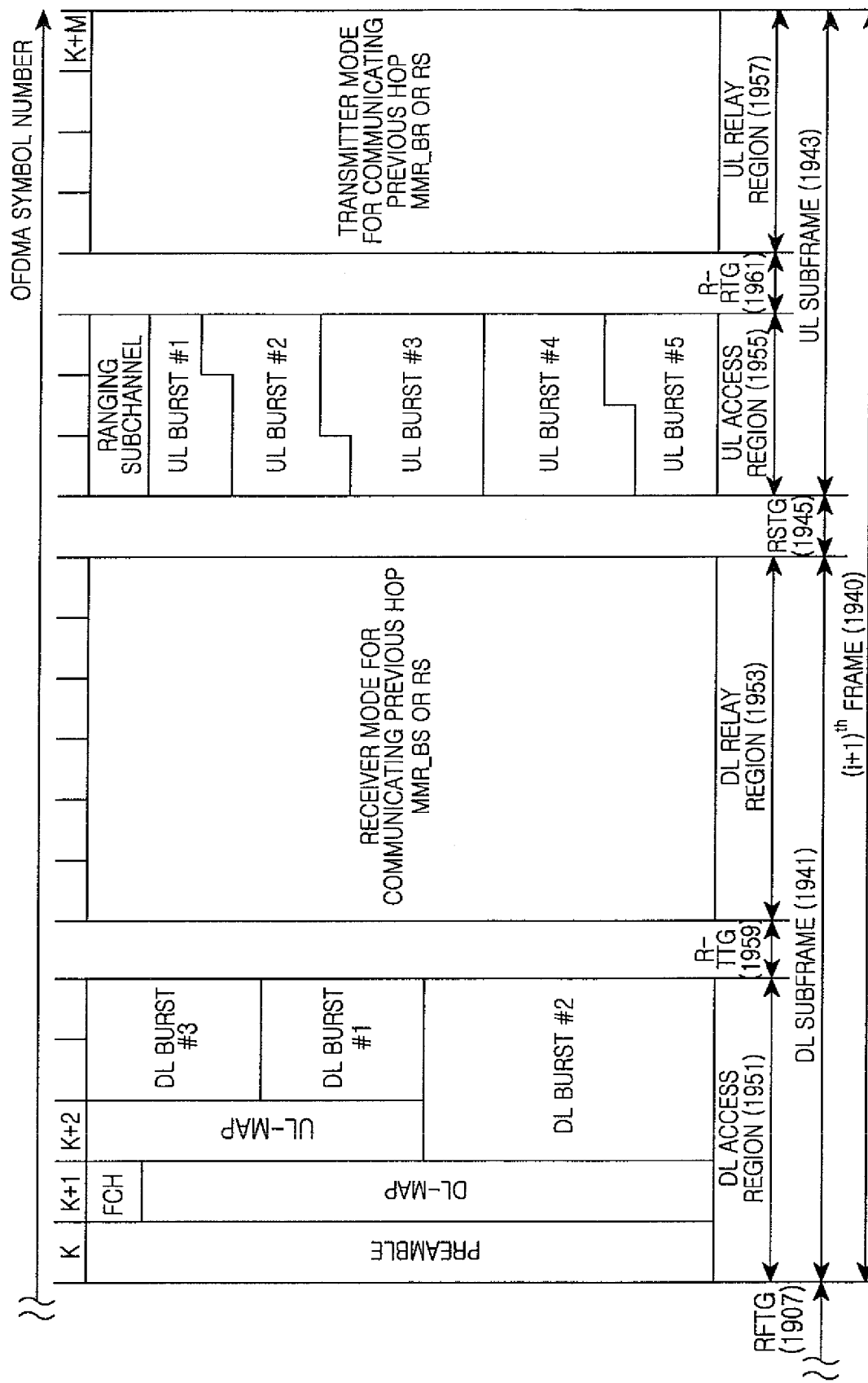
FIG. 24 is a diagram illustrating an $(i+1)^{th}$ frame structure for a terminal even-hop RS in the multi-hop relay BWA communication system according to an embodiment of the present invention.

The RS 305 receives UL data from the MS 311 for the first section of the UL subframe 523 in the $(i+1)^{th}$ frame 520, and transmits UL data to the RS 303 for the second section of the UL subframe 523. If the $(i+1)^{th}$ frame 520 is the same as that in the IEEE 802.16 standards, the RS 305 may perform communications using the $(i+1)^{th}$ frame illustrated in FIG. 24.

MS 307/MS 309/MS 311 receive DL data from the corresponding station (e.g. BS 301/RS 303/RS 305) for the DL subframes 511 and 521. Also, MS 307/MS 309/MS 311 transmit UL data to the corresponding station (e.g., BS 301/RS 303/RS 305) for the UL subframes 513 and 523.

For example, the MS 307 receives DL data from the BS 301 for the first section of the DL subframe 511 in the $i^{th}$ frame 510 and for the DL subframe 521 in the $(i+1)^{th}$ frame 520. Also, the MS 307 transmits UL data to the BS 301 for the first section of the UL subframe 513 in the $i^{th}$ frame 510 and for the UL subframe 523 in the $(i+1)^{th}$ frame 520. Because communications are performed between the BS 301 and the RS 303 for the second sections of the DL and UL subframes 511 and 513 in the $i^{th}$ frame 510, the MS 307 does not communicate (NULL) with the BS 301 for those second sections.

The MS 309 receives DL data from the RS 303 for the first section of the DL subframe 511 in the $i^{th}$ frame 510 and for the first section of the DL subframe 521 in the $(i+1)^{th}$ frame 520. Also the MS 309 transmits UL data to the RS 303 for the first section of the UL subframe 513 in the $i^{th}$ frame 510 and for the first section of the UL subframe 523 in the $(i+1)^{th}$ frame 520. Because communications are performed between the BS 301 and the RS 303 for the second sections of the DL and UL subframes 511 and 513 in the $i^{th}$ frame 510 and communications are performed between the RS 303 and the RS 305 for the second sections of the DL and UL subframes 521 and 523 in the $(i+1)^{th}$ frame 510, the MS 309 does not communicate (NULL) with the RS 303 for those second sections.

The MS 311 receives DL data from the RS 305 for the DL subframe 511 in the $i^{th}$ frame 510 and for the first section of the DL subframe 521 in the $(i+1)^{th}$ frame 520. Also, the MS 311 transmits UL data to the RS 305 for the UL subframe 513 in the $i^{th}$ frame 510 and for the first section of the UL subframe 523 in the $(i+1)^{th}$ frame 520. Because communications are performed between the RS 303 and the RS 305 for the second sections of the DL and UL subframes 521 and 523 in the $(i+1)^{th}$ frame 520, the MS 311 does not communicate (NULL) with the RS 305 for those second sections.

In the superframe 500, the BS 301, the RS 303 and the RS 305 have an MS sync channel (preamble) at the front of the first section of the DL subframe. Also, the BS 301, the RS 303 and the RS 305 have an RS sync channel (preamble) at the front or rear of the second section of the DL subframe. For example, if the lengths of the first and second sections are fixed, the RS sync channel is located at the front and rear of the second section. On the other hand, if the lengths of the first and second sections are variable, the RS sync channel is located at the rear of the second section.

When a relay service is provided using the superframe 500, the BS 301, the RSs 303 and 305, and the MSs 307, 309 and 311 may operate as described above. In this case, signals communicated by the BS 301, the RSs 303 and 305, and the MSs 307, 309 and 311 for the second sections of the superframe 500 may interfere with each other. For example, for the second section of the DL subframe 511 in the $i^{th}$ frame 510, the BS 301 transmits a signal to the RS 303 and the RS 305 transmits a signal to the MS 311. In this case, the signal transmitted by the RS 305 may interfere with the RS 303 and the signal transmitted by the BS 301 may interfere with the MS 311.

Thus, the communication system can reduce interference, which may occur between the signals communicated for the second section, by performing a scheduling for radio resources (time and frequency) or OFDM radio resources (subcarriers and subchannels). For example, the communication can reduce the occurrence of interference by performing a scheduling for radio resources so that the RS 305 may not transmit a signal to the MS 311 while the BS 301 transmits a signal to the RS 303. Also, the communication can reduce the occurrence of interference by performing a scheduling for radio resources so that the BS 301 may not transmit a signal to the RS 303 while the RS 305 transmits a signal to the MS 311.

In the case of an OFDMA scheme, the communication system can reduce the occurrence of interference by performing a resource scheduling so that an OFDM subcarrier or subchannel for transmission of a signal from the BS 301 to the RS 303 does not overlap with an OFDM subcarrier or subchannel for transmission of a signal from the RS 305 to the MS 311 in the second section.

In another embodiment, a signal that is transmitted from the RS 303 to the BS 301 for the second section of the UL subframe 513 in the $i^{th}$ frame 510 may interfere with the RS 305. Thus, the communication system can reduce the occurrence of interference by performing a scheduling for radio resources or OFDM radio resources.

Also, a signal that is transmitted from the RS 303 to the RS 305 for the second section of the DL subframe 521 in the $(i+1)^{th}$ frame 520 may interfere with the MS 307. Thus, the communication system can reduce the occurrence of interference by performing a scheduling for radio resources or OFDM radio resources.

Also, a signal that is transmitted from the RS 305 to the RS 303 for the second section of the UL subframe 523 in the $(i+1)^{th}$ frame 520 may interfere with the BS 301. Thus, the communication system can reduce the occurrence of interference by performing a scheduling for radio resources or OFDM radio resources.

According to the embodiments described above, the 3-hop relay BWA communication system can synchronously provide a relay service from all the service-providing stations.

Figure 6:
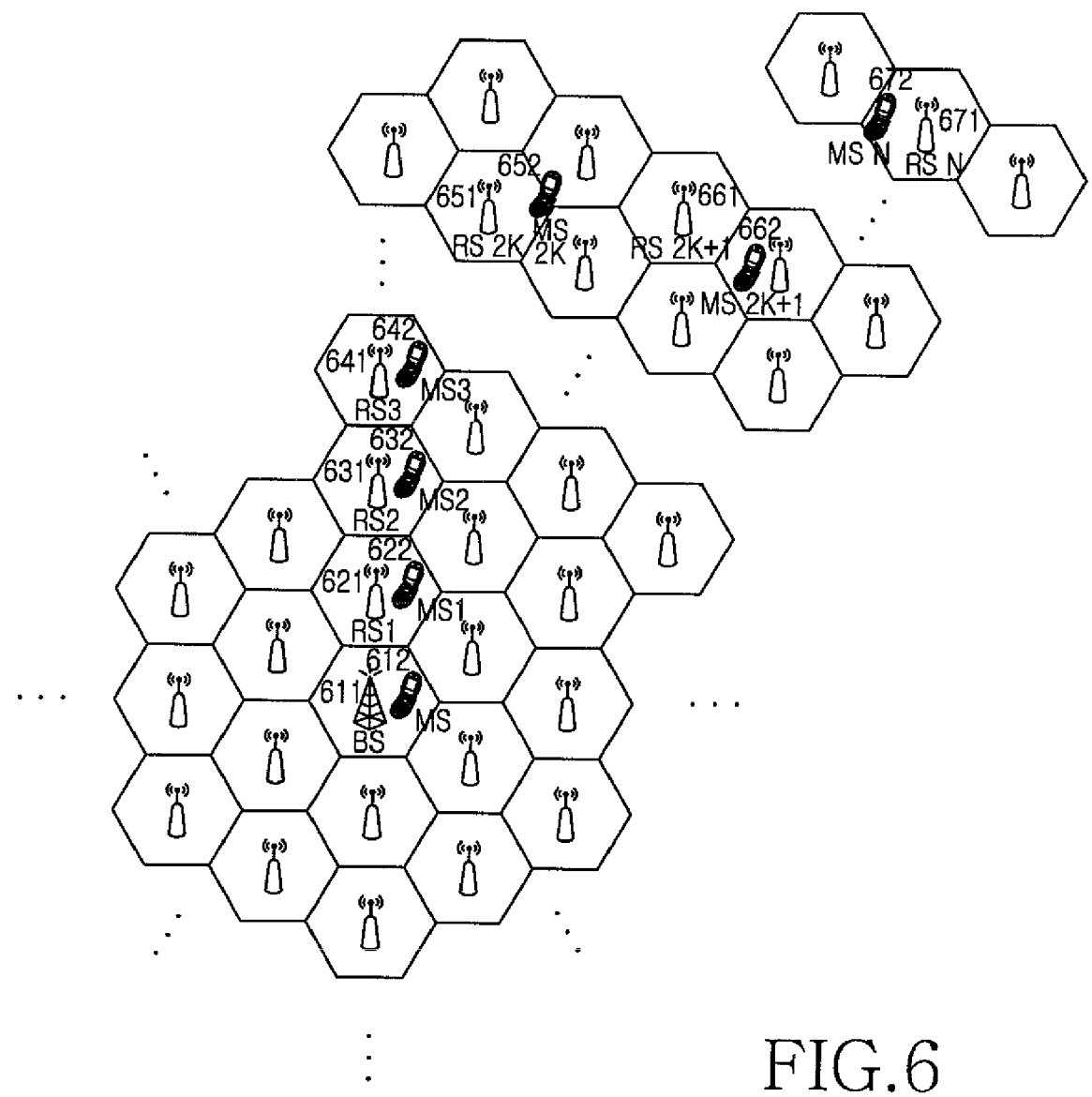
FIG. 6 is a diagram illustrating the configuration of the multi-hop relay BWA communication system according to an embodiment of the present invention.

FIG. 6 is a diagram illustrating the configuration of a multi-hop relay BWA communication system according to an embodiment of the present invention.

Referring to FIG. 6, a BS 611 can provide services to MSs outside its service area (i.e., coverage area) using even-hop RSs 631, 651 and 671 and odd-hop RSs 621, 641 and 661.

The BS 611 communicates with an MS 612 within its coverage area via a direct link. Also, the BS 611 communicates with the MSs outside its coverage area using the even-hop RSs 631, 651 and 671 and the odd-hop RSs 621, 641 and 661.

Each of the RSs 621, 631, 641, 651, 661 and 671 establishes a communication link with its upper RS or BS to relay communications between the BS and the MS within its coverage area.

Figure 7:
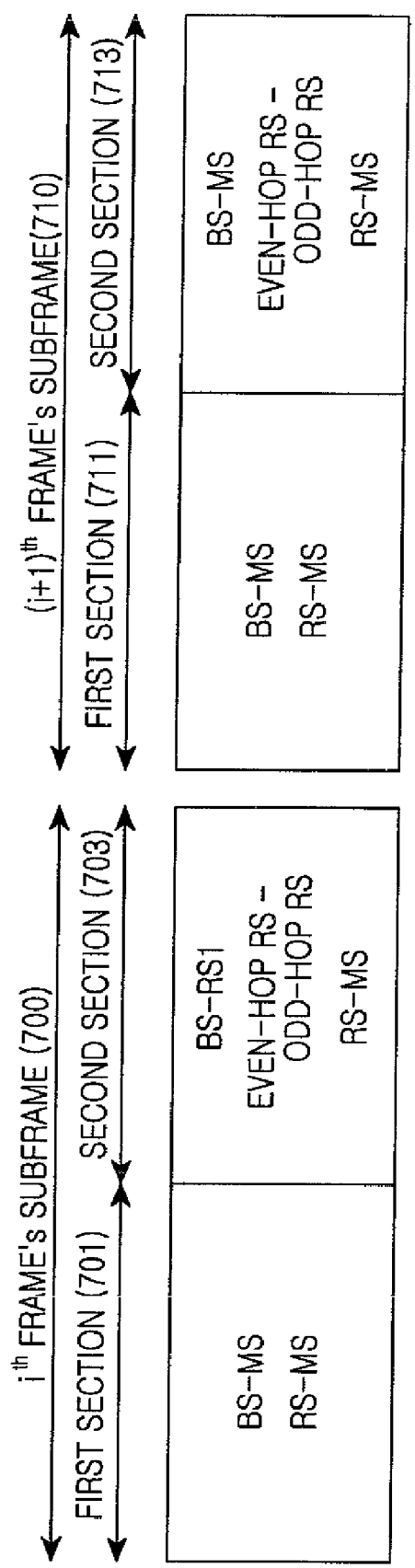
FIG. 7 is a diagram illustrating a subframe structure for the multi-hop relay BWA communication system according to an embodiment of the present invention.

In order to provide a relay service to the MSs synchronously from all service-providing stations, the multi-hop relay BWA communication system performs communications using subframes illustrated in FIG. 7. That is, in the multi-hop relay BWA communication system, the BS and the RSs simultaneously transmit data to the MSs within their coverage area using the subframes illustrated in FIG. 7. The following description is made assuming that the BWA communication system uses an N-hop relay scheme, and the last N-hop RS will be referred to as 'terminal RS'.

FIG. 7 is a diagram illustrating a subframe structure for the multi-hop relay BWA communication system according to an embodiment of the present invention.

Referring to FIG. 7, a subframe 700/710 of the $i^{th}/(i+1)^{th}$ frame is divided into a first section 701/711 and a second section 703/713.

In the subframe 700 of the $i^{th}$ frame, the first section 701 includes a BS-MS link subframe and an each RS-MS link subframe. Here, the link subframe indicates a resource allocation region.

The second section 703 includes a BS-RS1 link subframe, an even-hop RS-odd-hop RS link subframe, and a terminal RS-MS link subframe. The terminal RS-MS link subframe denotes a terminal even-hop RS-MS link subframe. That is, both of the first and second sections 701 and 703 include the terminal even-hop RS-MS link subframe.

In the subframe 710 of the $(i+1)^{th}$ frame, the first section 711 includes a BS-MS link subframe and an each RS-MS link subframe.

The second section 713 includes the BS-MS link subframe, an even-hop RS-odd-hop RS link subframe, and a terminal RS-MS link subframe. The terminal RS-MS link subframe denotes a terminal odd-hop RS-MS link subframe. That is, both of the first and second sections 711 and 713 include the BS-MS link subframe and terminal odd-hop RS-MS link subframe.

The subframes included in the first section 701/711 and the second section 703/713 may be multiplexed in an SDM scheme, an FDM scheme, or an OFDMA scheme.

Figure 8:
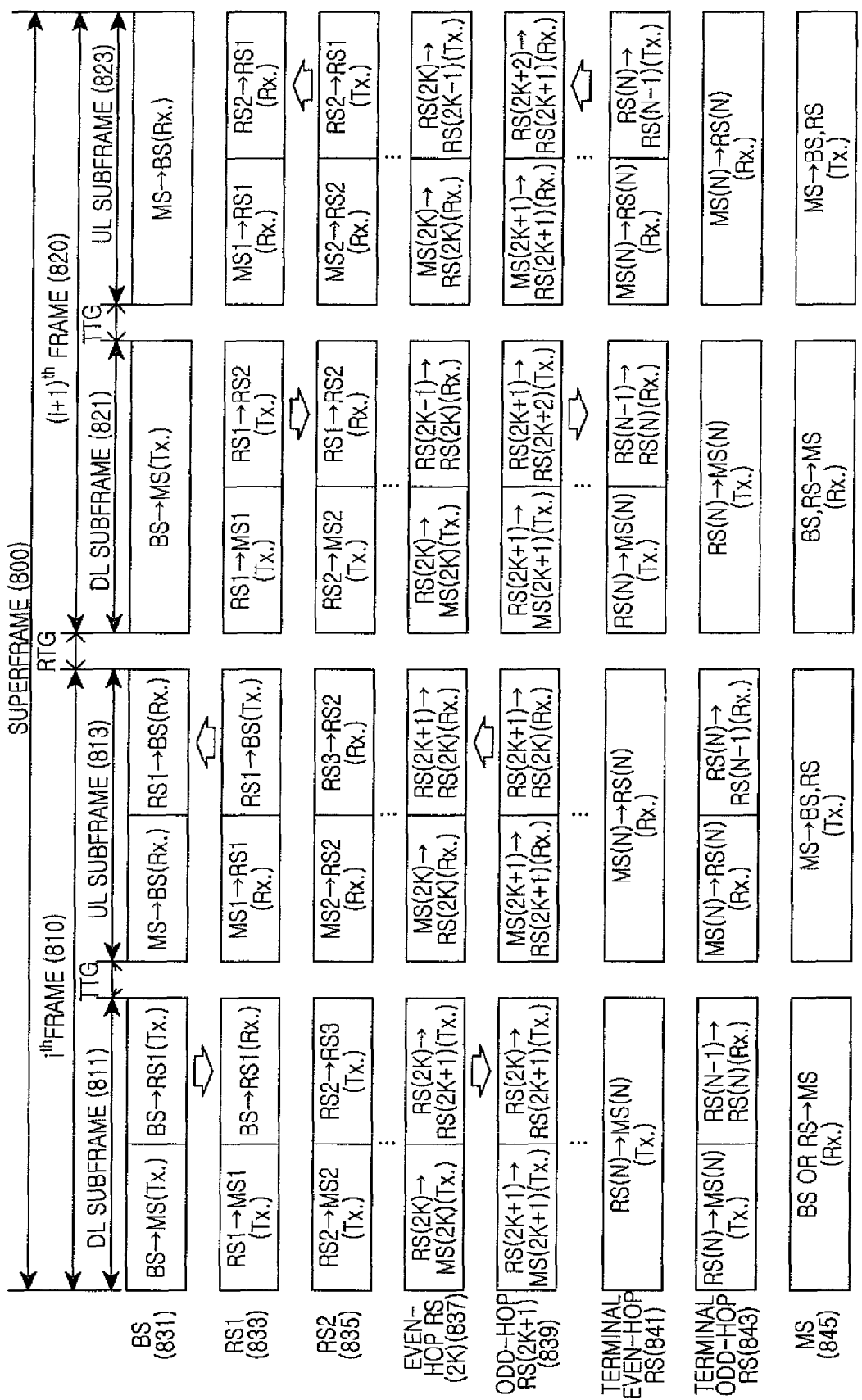
FIG. 8 is a diagram illustrating a frame structure for the multi-hop relay BWA communication system according to an embodiment of the present invention.

If the multi-hop relay BWA communication system performs communications using the subframes illustrated in FIG. 7, the BS, the RSs and the MSs may operate as illustrated in FIG. 8.

FIG. 8 is a diagram illustrating a frame structure for the multi-hop relay BWA communication system according to an embodiment of the present invention. The following description is made assuming that subframes are spatially multiplexed in first and second sections of a superframe 800.

Referring to FIG. 8, the $i^{th}/(i+1)^{th}$ frame 810/820 of a superframe 500 is divided into a DL subframe 811/821 and a UL subframe 813/823 in accordance with a TDD scheme. Each of the DL subframe 811/821 and the UL subframe 813/823 is divided into a first section and a second section, which are similar to those illustrated in FIG. 7.

A guard interval of a TTG exists between the DL subframe 811/821 and the UL subframe 813/823, and a guard interval of an RTG exists between the $i^{th}$ frame 810 and the $(i+1)^{th}$ frame 820.

If a relay service is provided using the superframe 800, a BS 831 transmits DL data to an MS within its coverage area for the first section of the DL subframe 811 in the $i^{th}$ frame 810. Also, the BS 831 transmits DL data to an RS 833 (RS1) for the second section of the DL subframe 811.

The BS 831 receives UL data from the MS for the first section of the UL subframe 813, and receives UL data from the RS 833 for the second section of the UL subframe 813. If the $i^{th}$ frame 810 is the same as that in the IEEE 802.16 standards, the BS 831 may perform communications using the $i^{th}$ frame illustrated in FIG. 15.

The BS 831 transmits DL data to the MS for the DL subframe 821 in the $(i+1)^{th}$ frame 820, and receives UL data from the MS for the UL subframe 823 in the $(i+1)^{th}$ frame 820. If the $(i+1)^{th}$ frame 820 is the same as that in the IEEE 802.16 standards, the BS 831 may perform communications using the $(i+1)^{th}$ frame illustrated in FIG. 16.

An RS 835 (RS2) is an even-hop RS (the RS 833 is an odd-hop RS) and thus its description will be omitted for conciseness.

An even-hop RS 837 transmits DL data to an MS within its coverage area for the first section of the DL subframe 811 in the $i^{th}$ frame 810. Also, the even-hop RS 837 transmits DL data to an odd-hop RS 839 for the second section of the DL subframe 811. For example, the $(2k)^{th}$ even-hop RS 837 transmits DL data to the $(2k+1)^{th}$ odd-hop RS 839 for the second section of the DL subframe 811, where 'k' is 0 to N/2 (N: the total number of hops).

Figure 17:
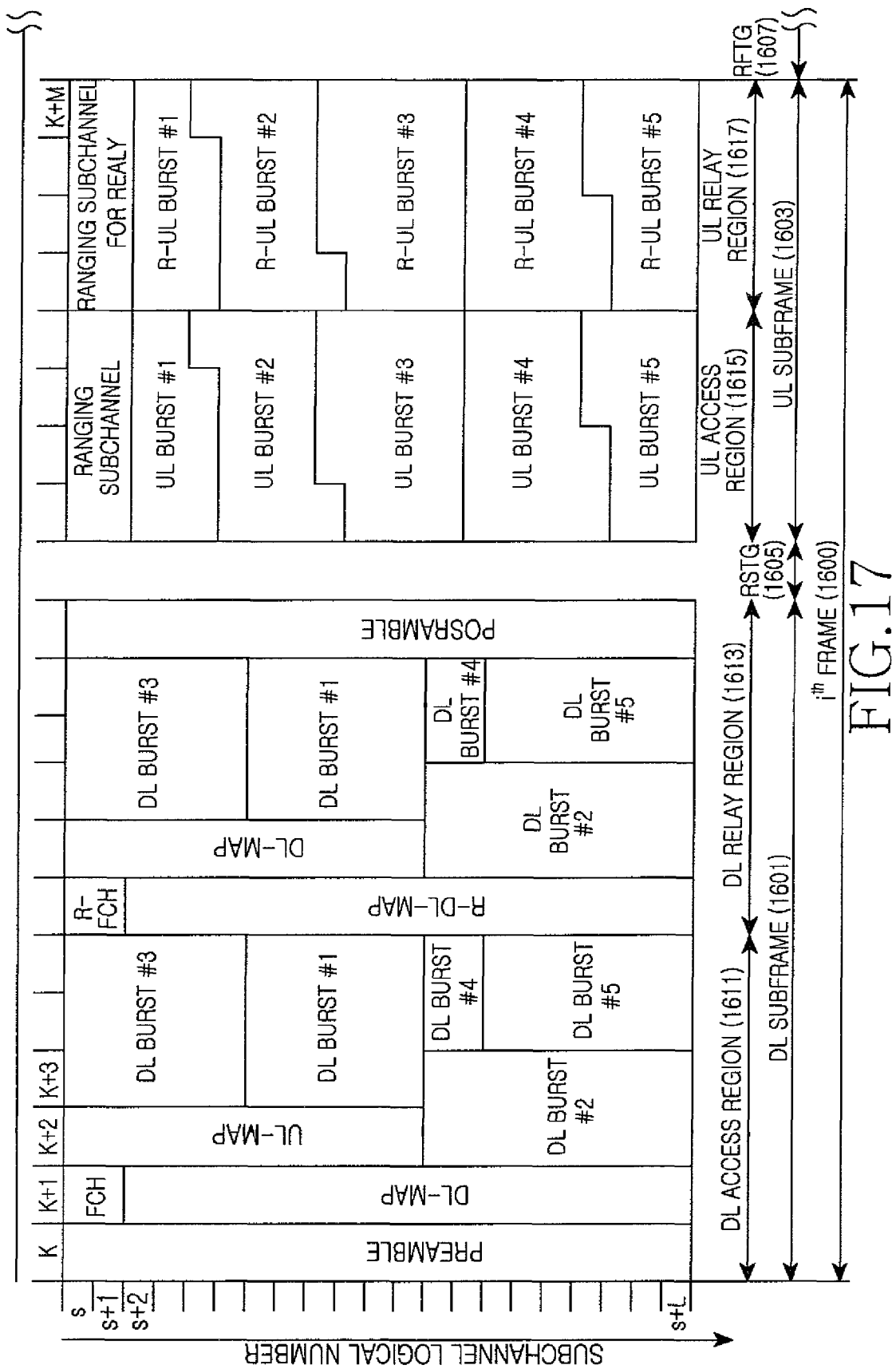
FIG. 17 is a diagram illustrating an $i^{th}$ frame structure for an even-hop RS in the multi-hop relay BWA communication system according to an embodiment of the present invention.

The even-hop RS 837 receives UL data from the MS for the first section of the UL subframe 813 in the $i^{th}$ frame 810, and receives UL data from the next odd-hop RS 839 for the second section of the UL subframe 813. For example, the $(2k)^{th}$ even-hop RS 837 receives UL data from the $(2k+1)^{th}$ odd-hop RS 839 for the second section of the DL subframe 813. If the $i^{th}$ frame 810 is the same as that in the 802.16 standards, the even-hop RS 837 may perform communications using the $i^{th}$ frame illustrated in FIG. 17.

The even-hop RS 837 transmits DL data to the MS for the first section of the DL subframe 821 in the $(i+1)^{th}$ frame 820, and receives DL data from the previous odd-hop RS for the second section of the DL subframe 821. For example, the $(2k)^{th}$ even-hop RS 837 receives DL data from the $(2k-1)^{th}$ odd-hop RS for the second section of the DL subframe 821.

Figure 18:
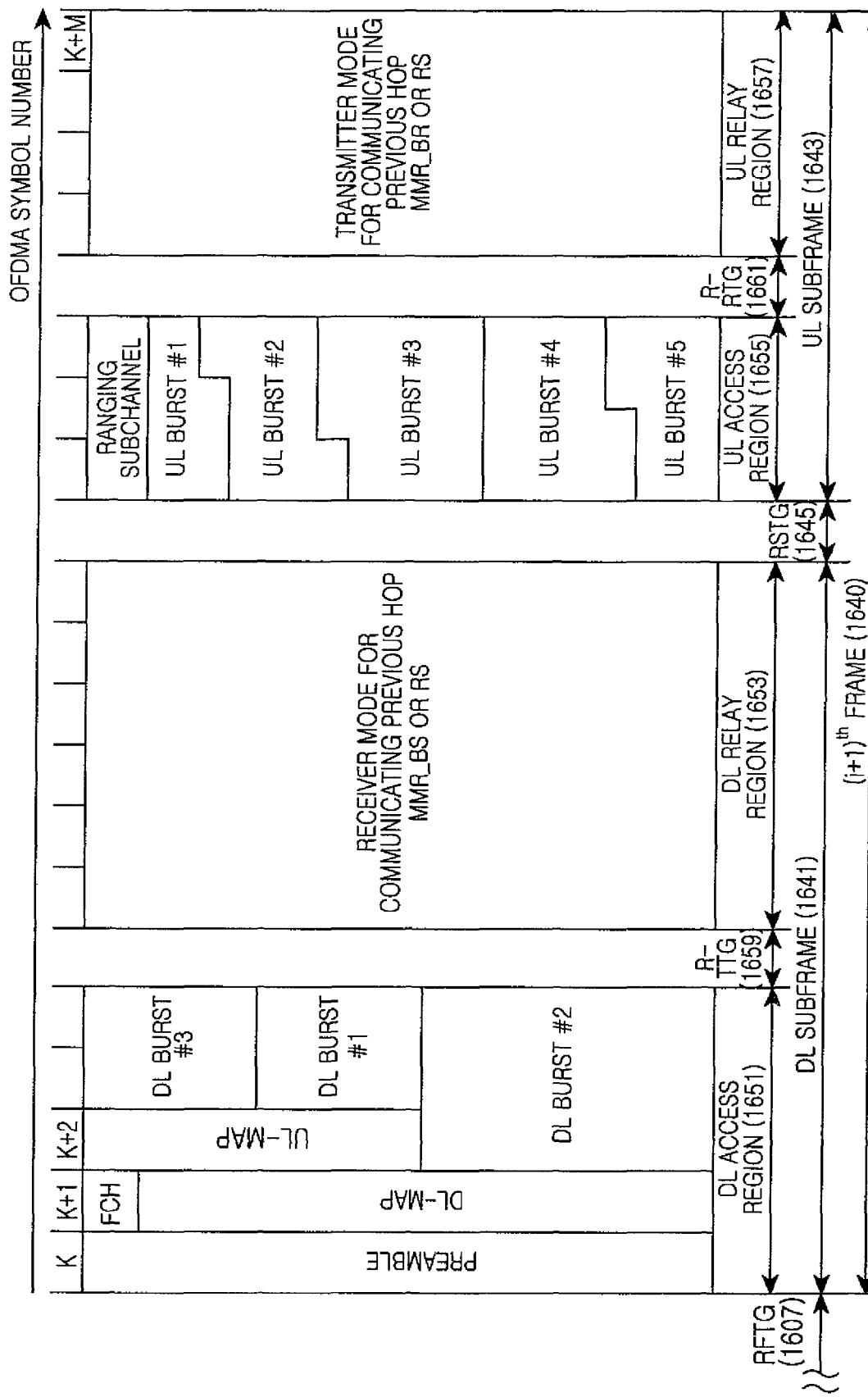
FIG. 18 is a diagram illustrating an $(i+1)^{th}$ frame structure for an even-hop RS in the multi-hop relay BWA communication system according to an embodiment of the present invention.

The even-hop RS 837 receives UL data from the MS for the first section of the UL subframe 823 in the $(i+1)^{th}$ frame 820, and transmits UL data to the previous odd-hop RS for the second section of the UL subframe 823. For example, the $(2k)^{th}$ even-hop RS 837 transmits UL data to the $(2k-1)^{th}$ odd-hop RS for the second section of the UL subframe 823. If the $(i+1)^{th}$ frame 820 is the same as that in the IEEE 802.16 standards, the even-hop RS 837 may perform communications using the $(i+1)^{th}$ frame illustrated in FIG. 18.

The odd-hop RS 839 transmits DL data to an MS within its coverage area for the first section of the DL subframe 811 in the $i^{th}$ frame 810. Also, the odd-hop RS 839 receives DL data from the previous even-hop RS 837 for the second section of the DL subframe 811. For example, the $(2k+1)^{th}$ odd-hop RS 839 receives DL data from the $(2k)^{th}$ even-hop RS 837 for the second section of the DL subframe 811.

The odd-hop RS 839 receives UL data from the MS for the first section of the UL subframe 813 in the $i^{th}$ frame 810, and transmits UL data to the previous even-hop RS 837 for the second section of the UL subframe 813. For example, the $(2k+1)^{th}$ odd-hop RS 839 transmits UL data to the $(2k)^{th}$ even-hop RS 837 for the second section of the L-L subframe 813. If the $i^{th}$ frame 810 is the same as that in the 802.16 standards, the odd-hop RS 839 may perform communications using the $i^{th}$ frame illustrated in FIG. 19.

The odd-hop RS 839 transmits DL data to the MS for the first section of the DL subframe 821 in the $(i+1)^{th}$ frame 820, and transmits DL data to the next even-hop RS for the second section of the DL subframe 821. For example, the $(2k+1)^{th}$ odd-hop RS 839 transmits DL data to the $(2k+2)^{th}$ even-hop RS for the second section of the DL subframe 821.

The odd-hop RS 839 receives UL data from the MS for the first section of the UL subframe 823 in the $(i+1)^{th}$ frame 820, and receives UL data from the next even-hop RS for the second section of the UL subframe 823. For example, the $(2k+1)^{th}$ odd-hop RS 839 receives UL data from the $(2k+2)^{th}$ even-hop RS for the second section of the UL subframe 823. If the $(i+1)^{th}$ frame 820 is the same as that in the IEEE 802.16 standards, the odd-hop RS 839 may perform communications using the $(i+1)^{th}$ frame illustrated in FIG. 20.

The terminal RS may be an even-hop RS. A terminal even-hop RS 841 transmits DL data to an MS within its coverage area for the first section of the DL subframe 811 in the $i^{th}$ frame 810. Also, the terminal even-hop RS 841 receives UL data from the MS for the second section of the UL subframe 813 in the $i^{th}$ frame 810. If the $i^{th}$ frame 810 is the same as that in the 802.16 standards, the terminal even-hop RS 841 may perform communications using the $i^{th}$ frame illustrated in FIG. 23.

The terminal even-hop RS 841 transmits DL data to the MS for the first section of the DL subframe 821 in the $(i+_1)^{th}$ frame 820, and receives DL data from the previous odd-hop RS for the second section of the DL subframe 821. For example, the $N^{th}$ terminal even-hop RS 841 receives DL data from the $(N-1)^{th}$ odd-hop RS for the second section of the DL subframe 821.

The terminal even-hop RS 841 receives UL data from the MS for the first section of the UL subframe 823 in the $(i+_1)^{th}$ frame 820, and transmits UL data to the previous odd-hop RS for the second section of the UL subframe 823. For example, the $N^{th}$ terminal even-hop RS 841 transmits UL data to the $(N-1)^{th}$ odd-hop RS for the second section of the UL subframe 823. If the $(i+1)^{th}$ frame 820 is the same as that in the IEEE 802.16 standards, the terminal even-hop RS 841 may perform communications using the $(i+1)^{th}$ frame illustrated in FIG. 24.

The terminal RS may be an odd-hop RS. A terminal odd-hop RS 843 transmits DL data to an MS within its coverage area for the first section of the DL subframe 811 in the $i^{th}$ frame 810. Also, the terminal odd-hop RS 843 receives DL data from the previous even-hop RS for the second section of the DL subframe 811. For example, the N'h terminal odd-hop RS 843 receives DL data from the $(N-1)^{th}$ even-hop RS for the second section of the DL subframe 811.

Figure 21:
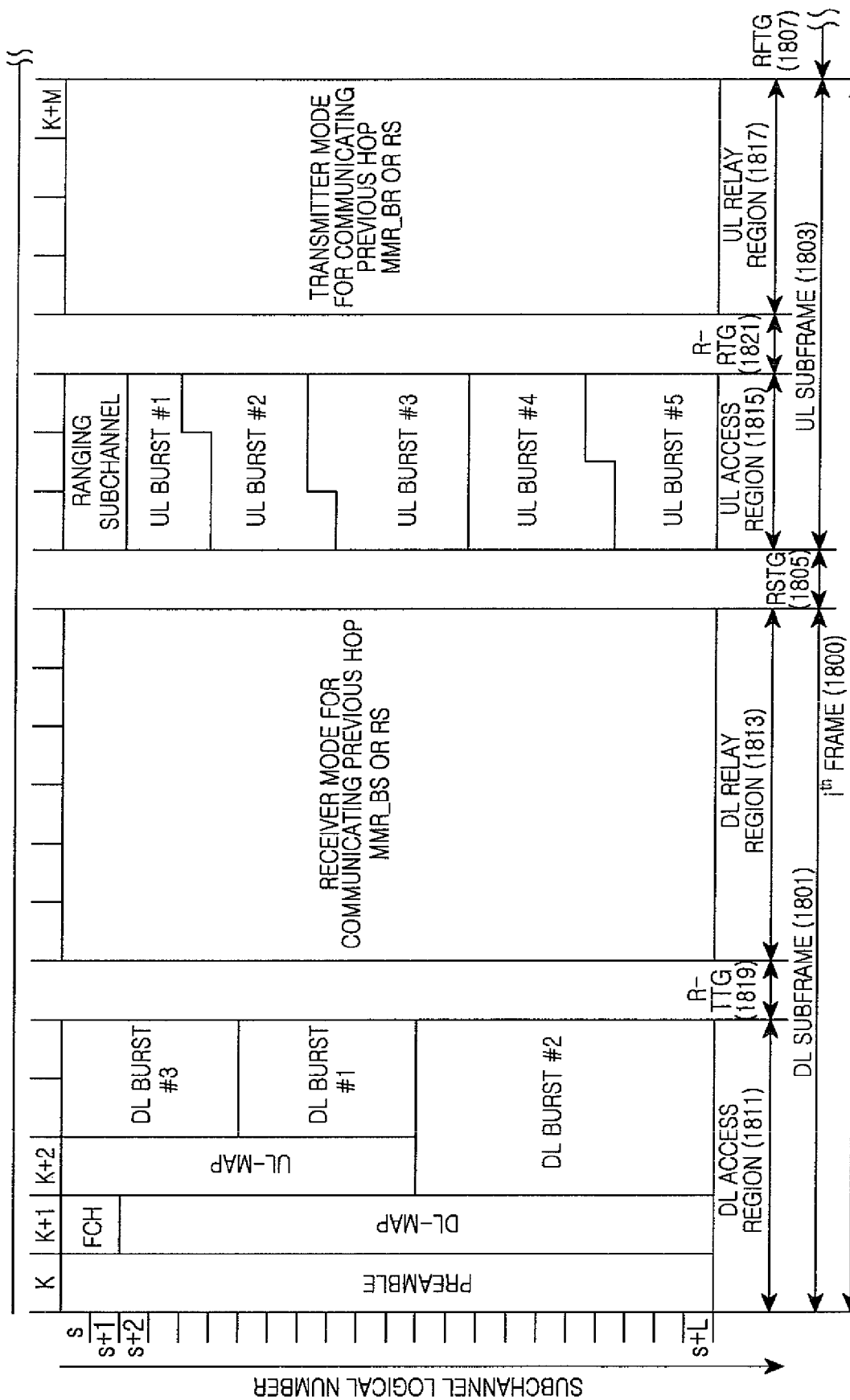
FIG. 21 is a diagram illustrating an $i^{th}$ frame structure for a terminal odd-hop RS in the multi-hop relay BWA communication system according to an embodiment of the present invention.

The terminal odd-hop RS 843 receives UL data from the MS for the first section of the UL subframe 813 in the $i^{th}$ frame 810, and transmits UL data to the previous even-hop RS for the second section of the UL subframe 813. For example, the $N^{th}$ terminal odd-hop RS 843 transmits UL data to the $(N-1)^{th}$ even-hop RS for the second section of the DL subframe 813. If the $i^{th}$ frame 810 is the same as that in the IEEE 802.16 standards, the terminal odd-hop RS 843 may perform communications using the $i^{th}$ frame illustrated in FIG. 21.

Figure 22:
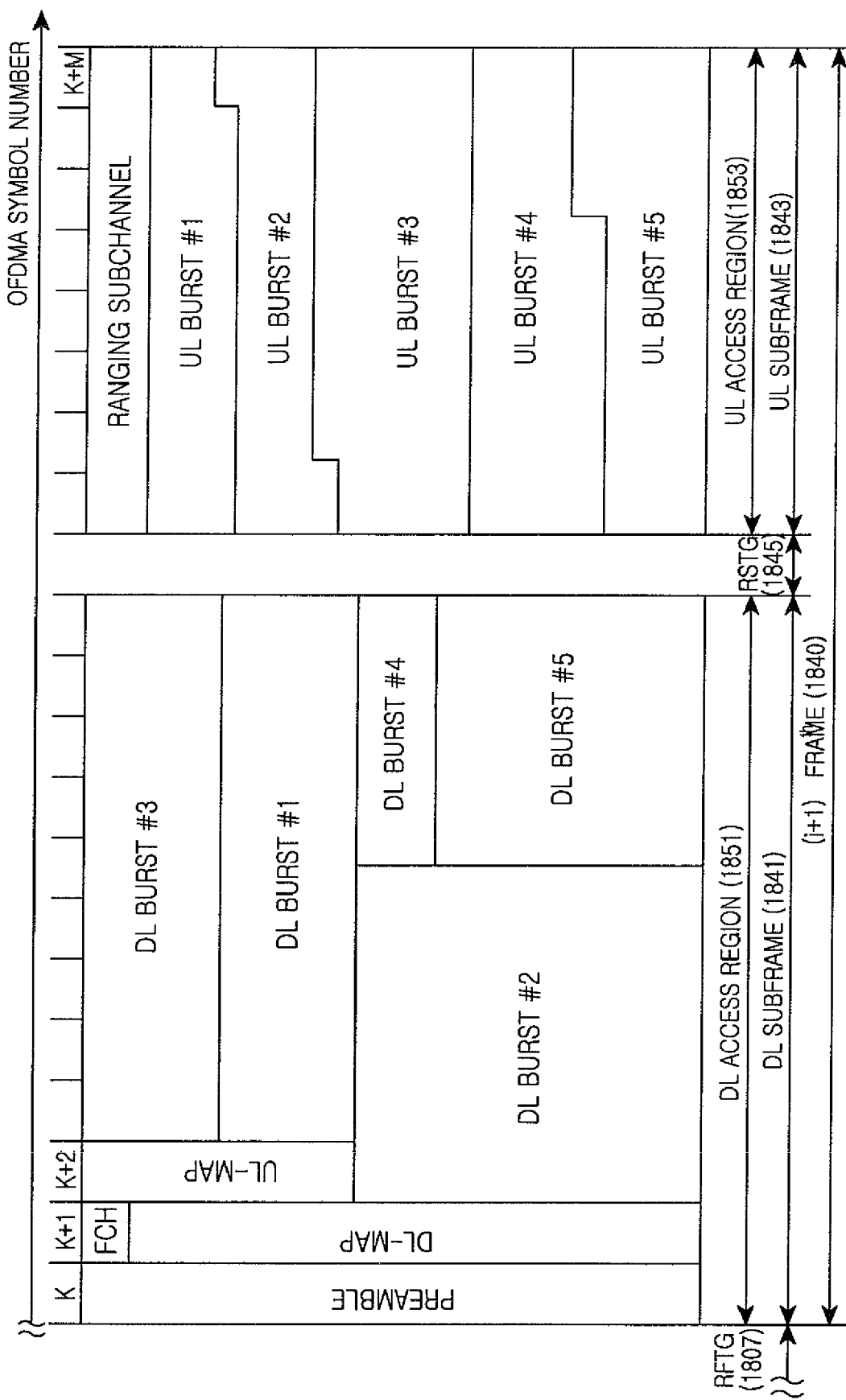
FIG. 22 is a diagram illustrating an $(i+1)^{th}$ frame structure for a terminal odd-hop RS in the multi-hop relay BWA communication system according to an embodiment of the present invention.

The terminal odd-hop RS 843 transmits DL data to the MS for the DL subframe 821 of the $(i+1)^{th}$ frame 820, and receives UL data from the MS for the UL subframe 823 of the $(i+1)^{th}$ frame 820. If the $(i+1)^{th}$ frame 820 is the same as that in the IEEE 802.16 standards, the terminal odd-hop RS 843 may perform communications using the $(i+1)^{th}$ frame illustrated in FIG. 22.

The $i^{th}$ frame 810 and the $(i+1)^{th}$ frame 820 have the same structure in the case of the MSs communicating with the BS 831 and the RSs 833, 835, 837, 839, 841, and 843. That is, the MSs receive DL data from the BS or the RSs for the DL subframe 811 or 821 and transmits UL data to the BS or the RSs for the UL subframe 813 or 823.

In the superframe 800, the BS 831 and the RSs 833, 835, 837, 839, 841 and 843 have an MS sync channel (preamble) at the front of the first section of the DL subframe. Also, the BS 831 and the RSs 833, 835, 837, 839, 841 and 843 have an RS sync channel (preamble) at the front or rear of the second section of the DL subframe.

When a relay service is provided using the superframe 800, the BS 831, the RSs 833, 835, 837, 839, 841 and 843, and the MSs may operate as described above. In this case, signals communicated by the BS 831, the RSs 833, 835, 837, 839, 841 and 843, and the MSs for the second sections of the superframe 800 may interfere with each other. For example, for the second section of the DL subframe 811 in the $i^{th}$ frame 810, the BS 831 transmits a signal to the RS 833 and the RS 835 transmits a signal to an RS 3. In this case, the signal transmitted by the RS 835 may interfere with the RS 833 and the signal transmitted by the BS 831 may interfere with the RS 3.

Thus, the communication system can reduce interference, which may occur between the signals communicated for the second section, by performing a scheduling for radio resources (time and frequency) or OFDM radio resources (subcarriers and subchannels). For example, the communication can reduce the occurrence of interference by performing a scheduling for radio resources so that the RS 835 may not transmit a signal to the RS 3 while the BS 831 transmits a signal to the RS 833. Also, the communication can reduce the occurrence of interference by performing a scheduling for radio resources so that the BS 831 may not transmit a signal to the RS 833 while the RS 835 transmits a signal to the RS 3.

In the case of an OFDMA scheme, the communication system can reduce the occurrence of interference by performing a resource scheduling so that an OFDM subcarrier or subchannel for transmission of a signal from the BS 831 to the RS 833 does not overlap with an OFDM subcarrier or subchannel for transmission of a signal from the RS 835 to the RS 3 in the second section.

In another embodiment, a signal that is transmitted from the odd-hop RS 839 to the BS 831 and an even-hop RS for the second section of the UL subframe 813 in the $i^{th}$ frame 810 may interfere with the BS 831 or another even-hop RS (which is not the destination). Thus, the communication system can reduce the occurrence of interference by performing a scheduling for radio resources or OFDM radio resources.

Also, a signal that is transmitted from the odd-hop RS 839 to an even-hop RS for the second section of the DL subframe 821 in the $(i+1)^{th}$ frame 820 may interfere with another even-hop RS (which is not the destination). Thus, the communication system can reduce the occurrence of interference by performing a scheduling for radio resources or OFDM radio resources.

Also, a signal that is transmitted from the even-hop RS 837 to an odd-hop RS for the second section of the UL subframe 823 in the $(i+1)^{th}$ frame 820 may interfere with another odd-hop RS (which is not the destination). Thus, the communication system call reduce the occurrence of interference by performing a scheduling for radio resources or OFDM radio resources.

As described above, the multi-hop relay BWA communication system prevents the occurrence of interference by scheduling radio resource or OFDM resources among the BS, the RSs and the MSs. For example, a signal that is transmitted from the BS and the even-hop RS to an odd-hop RS for the second section of the DL subframe 811 in the $i^{th}$ frame 810 may interfere with another odd-hop RS (which is not the destination). Thus, the communication system can prevent the occurrence of interference by performing a scheduling for radio resources or OFDM radio resources.

As described above, using the subframes illustrated in FIG. 4 or 7, the multi-hop relay BWA communication system operates as illustrated in FIG. 5 or 8. When the BS and the MSs perform communications in accordance with the IEEE 802.16 standards, the RSs provide a relay service using a frame structure illustrated in FIGS. 9A and 9B, for the transparency of the relay service.

Figure 9A:
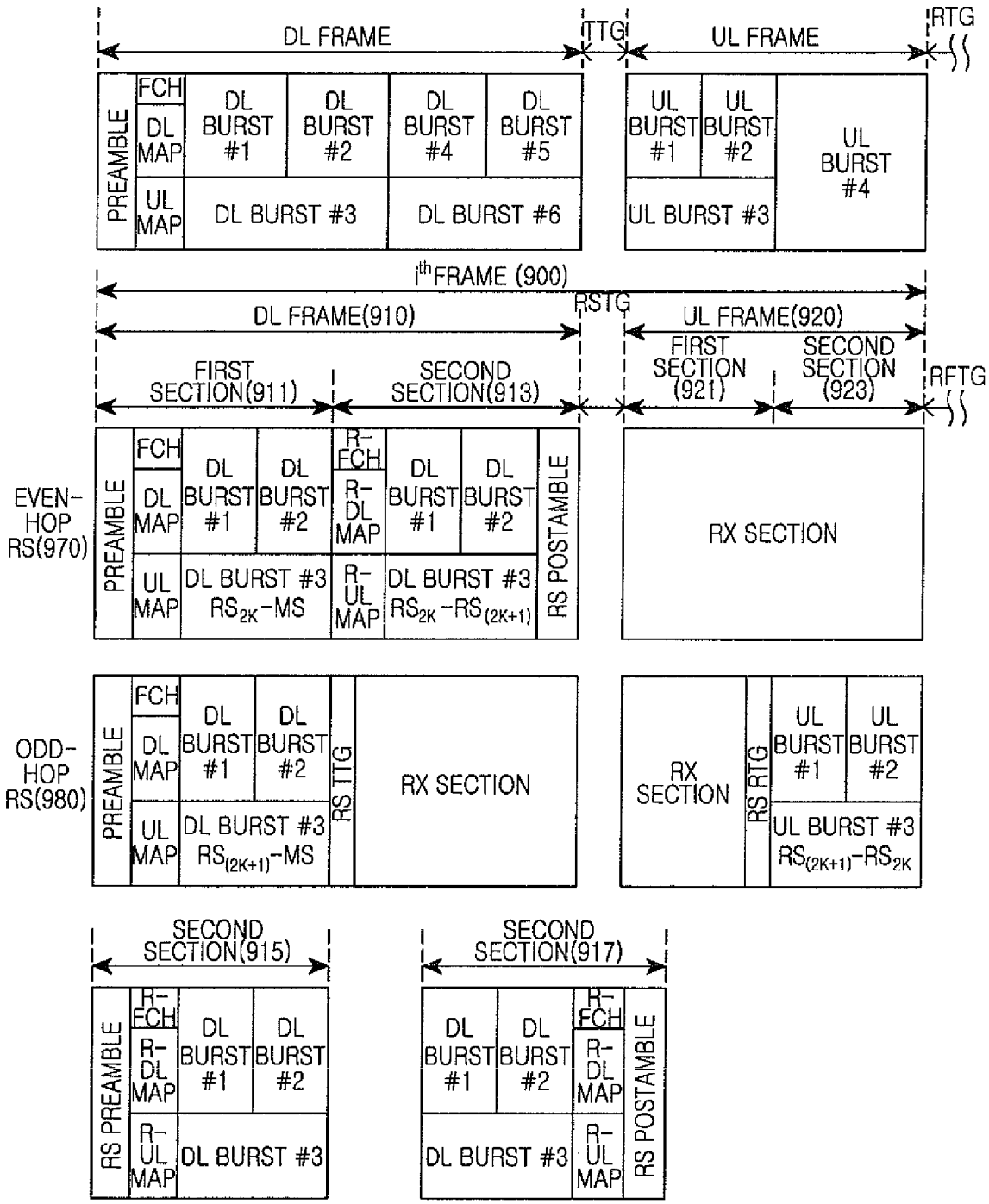
FIGS. 9A and 9B are diagrams illustrating a frame structure for each RS in the multi-hop relay BWA communication system according to an embodiment of the present invention.
Figure 9B:
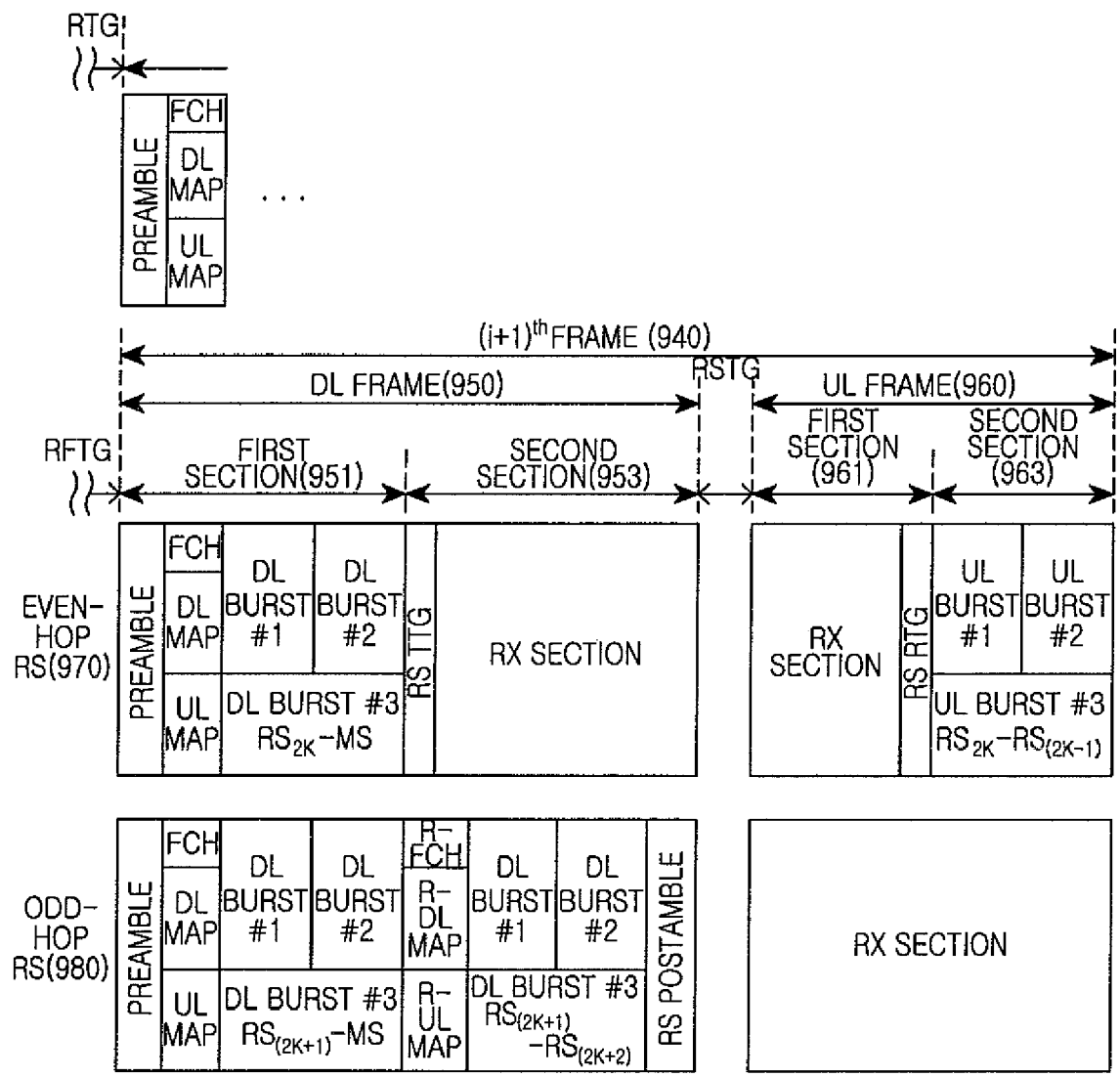

FIGS. 9A and 9B are diagrams illustrating a frame structure for each RS in the multi-hop relay BWA communication system according to an embodiment of the present invention.

Referring to FIGS. 9A and 9B, the $i^{th}/(i+1)^{th}$ frame 900/940 is divided into a DL subframe 910/950 and a UL subframe 920/960 in accordance with a TDD scheme. The $i^{th}$ frame 900 and the $(i+1)^{th}$ frame 940 have the same length as an IEEE 802.16 frame 990.

Each of the DL subframe 910/950 and the UL subframe 920/960 is divided into a first section and a second section. A guard interval of a Relay Subframe Time Gap (RSTG) exists between the DL subframe 910/950 and the UL subframe 920/960, and a guard interval of a Relay Frame Time Gap (RFTG) exists between the $i^{th}$ frame 900 and the $(i+1)^{th}$ frame 940. The RSTG has the same length as the difference between a downlink one-way delay and a TTG of the IEEE 802.16 frame 990. The RFTG has the same length as the sum of an uplink one-way delay and an RTG of the IEEE 802.16 frame 990.

The DL subframe 910 of the $i^{th}$ frame 900 is divided into a first section 911 and a second section 913.

The first section 911 includes a subframe for transmitting DL signals from an even-hop RS 970 and an odd-hop RS 980 to MSs within their coverage area. The subframe includes a preamble for MS synchronization control information, and DL bursts in sequence. The preamble and the control information have a fixed location.

The second section 913 includes a subframe for transmitting a DL signal from the even-hop RS 970 to the next odd-hop RS 980. The subframe includes control information, DL bursts, and an RS postamble that is a sync channel for synchronization of the next odd-hop RS 980.

The odd-hop RS 980 receives a signal from the previous even-hop RS 970. The odd-hop RS 980 switches between the first section 911 and the second section 913. Thus, a guard interval of an RS TTG exists between the first and second sections 911 and 913 of the DL subframe 910 for the odd-hop RS 980. Although not illustrated in FIGS. 9A and 9B, a guard interval may also exist between the first and second sections 911 and 913 of the DL subframe 910 for the even-hop RS 970.

The UL subframe 920 of the $i^{th}$ frame 900 is divided into a first section 921 and a second section 923.

For the first section 921, the even-hop RS 970 and the odd-hop RS 980 receives UL data from MSs within their coverage.

The second section 923 includes UL bursts that are transmitted from the odd-hop RS 980 to the previous even-hop RS 970. At this point, the even-hop RS 970 receives a signal from the next odd-hop RS 980. Here, the odd-hop RS 980 switches between the first section 921 and the second section 923. Thus, a guard interval of an RS TTG exists between the first and second sections 921 and 923 of the UL subframe 920 for the odd-hop RS 980. Although not illustrated in FIGS. 9A and 9B, a guard interval may also exist between the first and second sections 921 and 923 of the UL subframe 920 for the even-hop RS 970.

The DL subframe 950 of the $(i+1)^{th}$ frame 950 is divided into a first section 951 and a second section 953.

The first section 951 includes a subframe for transmitting DL signals from an even-hop RS 970 and an odd-hop RS 980 to MSs within their coverage area. The subframe includes a preamble for MS synchronization, control information, and DL bursts in sequence. The preamble and the control information have a fixed location.

The second section 953 includes a subframe for transmitting a DL signal from the odd-hop RS 980 to the next even-hop RS. The subframe includes control information. DL bursts, and an RS postamble that is a sync channel for synchronization of the next even-hop RS, in sequence.

The even-hop RS 970 receives a signal from the previous odd-hop RS. The even-hop RS 970 switches between the first section 951 and the second section 953. Thus, a guard interval of an RS TTG exists between the first and second sections 951 and 953 of the DL subframe 950 for the even-hop RS 970. Although not illustrated in FIGS. 9A and 9B, a guard interval may also exist between the first and second sections 951 and 953 of the DL subframe 950 for the odd-hop RS 980.

The UL subframe 960 of the $(i+1)^{th}$ frame 950 is divided into a first section 961 and a second section 963.

For the first section 961, the even-hop RS 970 and the odd-hop RS 980 receives UL data from MSs within their coverage.

The second section 963 includes UL bursts that are transmitted from the even-hop RS 970 to the previous odd-hop RS. At this point, the odd-hop RS 980 receives a signal from the next even-hop RS. Here, the even-hop RS 970 switches between the first section 961 and the second section 963. Thus, a guard interval of an RS RTG exists between the first and second sections 961 and 963 of the UL subframe 960 for the even-hop RS 970. Although not illustrated in FIGS. 9A and 9B, a guard interval may also exist between the first and second sections 961 and 963 of the UL subframe 960 for the odd-hop RS 980.

When the sizes of the first and second sections change dynamically depending on the loads of the RSs and the MSs, a sync channel synchronized with the RSs is located at the rear of the second section 917. In this case, control information transmitted to the RSs may also be located at the rear of the second section.

In another embodiment, when the sizes of the first and second sections are fixed, a sync channel synchronized with the RSs may be located at the front of the second section 915.

Hereinafter, a description is given of a BS/RS operation for providing a relay service synchronously from all the service-providing stations. That is, a description is given of a BS/RS operation in the communication system of FIG. 5 or 8. The following description is made assuming that the BS transmits to each RS or MS resource allocation information according to the frame structure.

Figure 10:
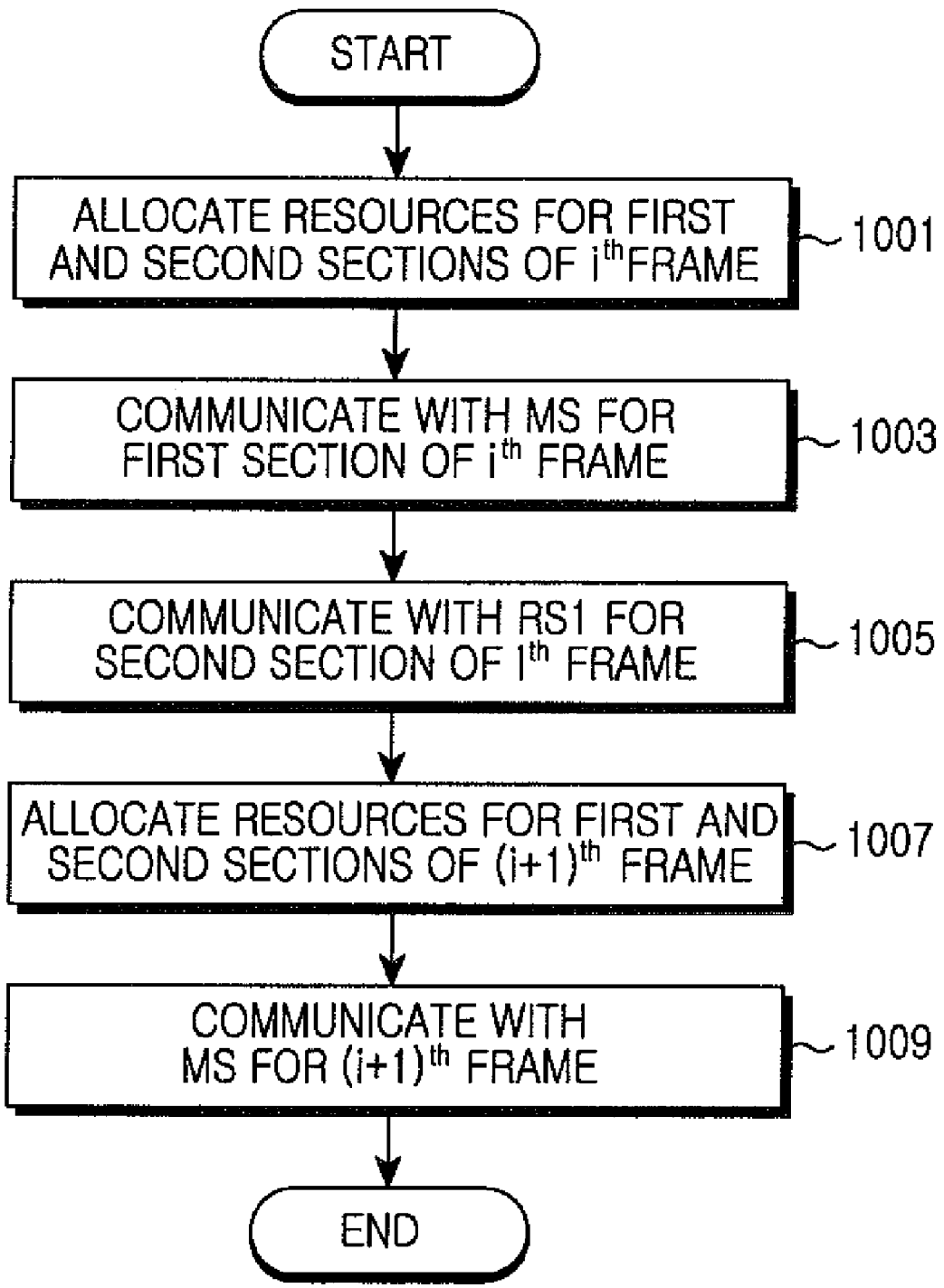
FIG. 10 is a flowchart illustrating an operation of a BS in the multi-hop relay BWA communication system according to an embodiment of the present invention.

FIG. 10 is a flowchart illustrating an operation of a BS in the multi-hop relay BWA communication system according to an embodiment of the present invention.

Referring to FIG. 10, in step 1001, the BS allocates resources for the first and second sections of the $i^{th}$ frame. For example, the BS allocates resources for performing communications of RSs and MSs as the frame structure illustrated in FIG. 5 or 8.

In step 1003, the BS communicates with an MS connected via a direct link for the first section of the $i^{th}$ frame.

Thereafter, in step 1005, the BS communicates with a 1-hop RS for the second section of the $i^{th}$ frame. For example, the BS transmits DL data to the MS for the first section of the DL sub flame in the $i^{th}$ frame, and transmits DL data to the 1-hop RS for the second section. Also, the BS receives UL data from the MS for the first section of the UL subframe in the $i^{th}$ frame, and receives UL data from the 1-hop RS for the second section.

In step 1007, the BS allocates resources for the first and second sections of the $(i+1)^{th}$ frame. For example, the BS allocates resources for performing communications of RSs and MSs as the frame structure illustrated in FIG. 5 or 8.

Thereafter, in step 1009, the BS communicates with an MS connected via a direct link for the $(i+1)^{th}$ frame. For example, the BS transmits DL data to the MS for the DL subframe in the $(i+1)^{th}$ frame. Also, the BS receives UL data from the MS for the UL subframe in the $(i+1)^{th}$ frame.

Thereafter, the BS ends the operation.

Figure 11:
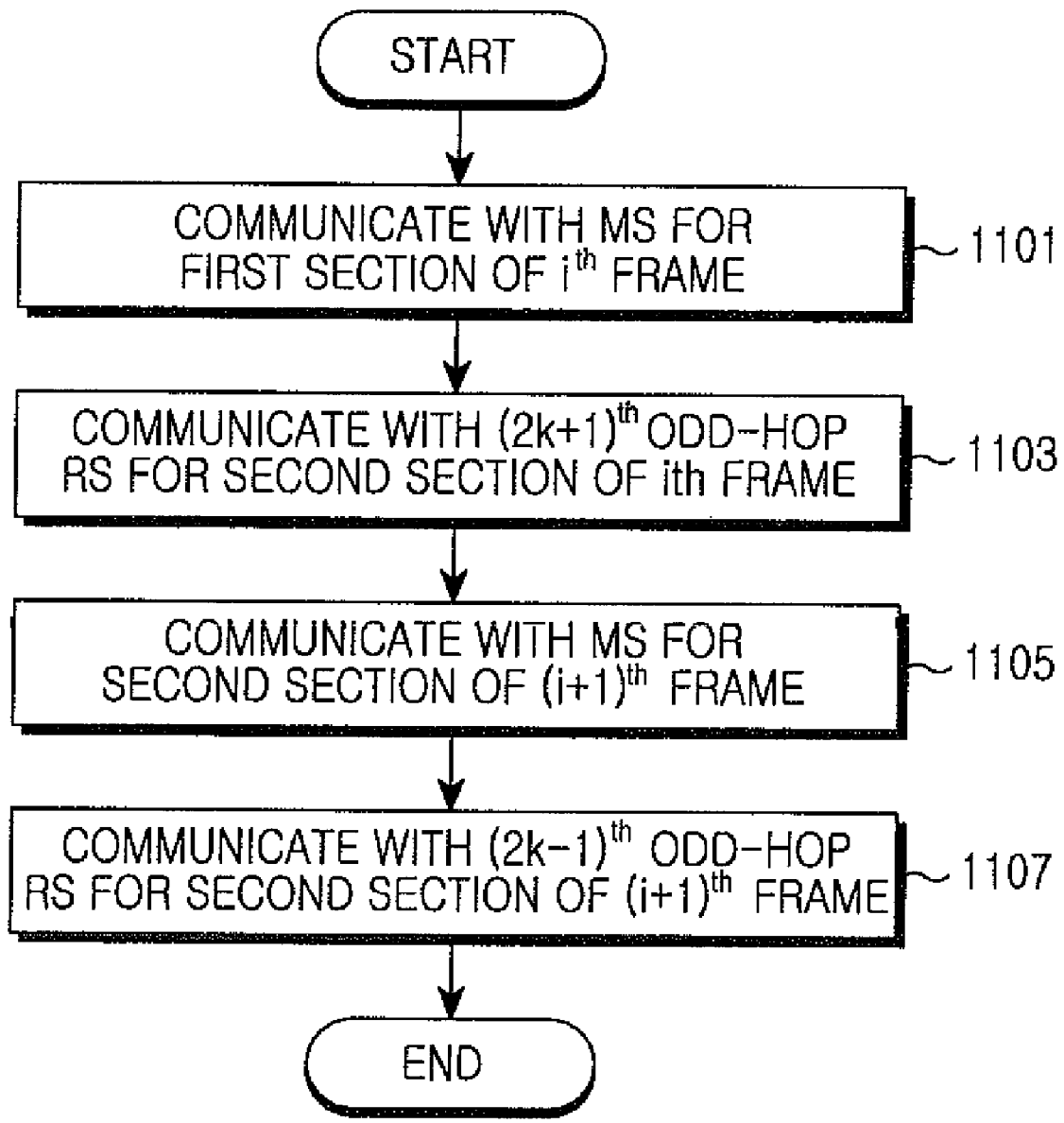
FIG. 11 is a flowchart illustrating an operation of an even-hop RS in the multi-hop relay BWA communication system according to an embodiment of the present invention.

FIG. 11 is a flowchart illustrating an operation of an even-hop RS in the multi-hop relay BWA communication system according to an embodiment of the present invention. In the following description, it is assumed that the even-hop RS receives resource allocation information from the BS.

Referring to FIG. 11, in step 1101, the even-hop RS communicates with MSs within its coverage area for the first section of the $i^{th}$ frame.

Thereafter, in step 1103, the even-hop RS communicates with the next odd-hop RS for the second section of the $i^{th}$ frame. That is, the $(2k)^{th}$ even-hop RS communicates with the $(2k+1)^{th}$ odd-hop RS for the second section of the $i^{th}$ flame.

For example, the even-hop RS transmits DL data to the MS for the first section of the DL subframe in the $i^{th}$ frame, and transmits DL data to the next odd-hop RS for the second section. Also, the even-hop RS receives UL data from the MS for the first section of the UL subframe in the $i^{th}$ frame, and receives UL data from the next odd-hop RS for the second section.

In step 1105, the even-hop RS communicates with MSs within its coverage area for the first section of the $(i+1)^{th}$ frame.

Thereafter, in step 1107, the even-hop RS communicates with the previous odd-hop RS for the second section of the $(i+1)^{th}$ frame. That is, the $(2k)^{th}$ even-hop RS communicates with the $(2k-1)^{th}$ odd-hop RS for the second section.

For example, the even-hop RS transmits DL data to the MS for the first section of the DL subframe in the $(i+1)^{th}$ frame, and receives DL data from the previous odd-hop RS for the second section. Also, the even-hop RS receives UL data from the MS for the first section of the UL subframe in the $(i+1)^{th}$ frame, and transmits UL data to the previous odd-hop RS for the second section.

Thereafter, the even-hop RS ends the operation.

Figure 12:
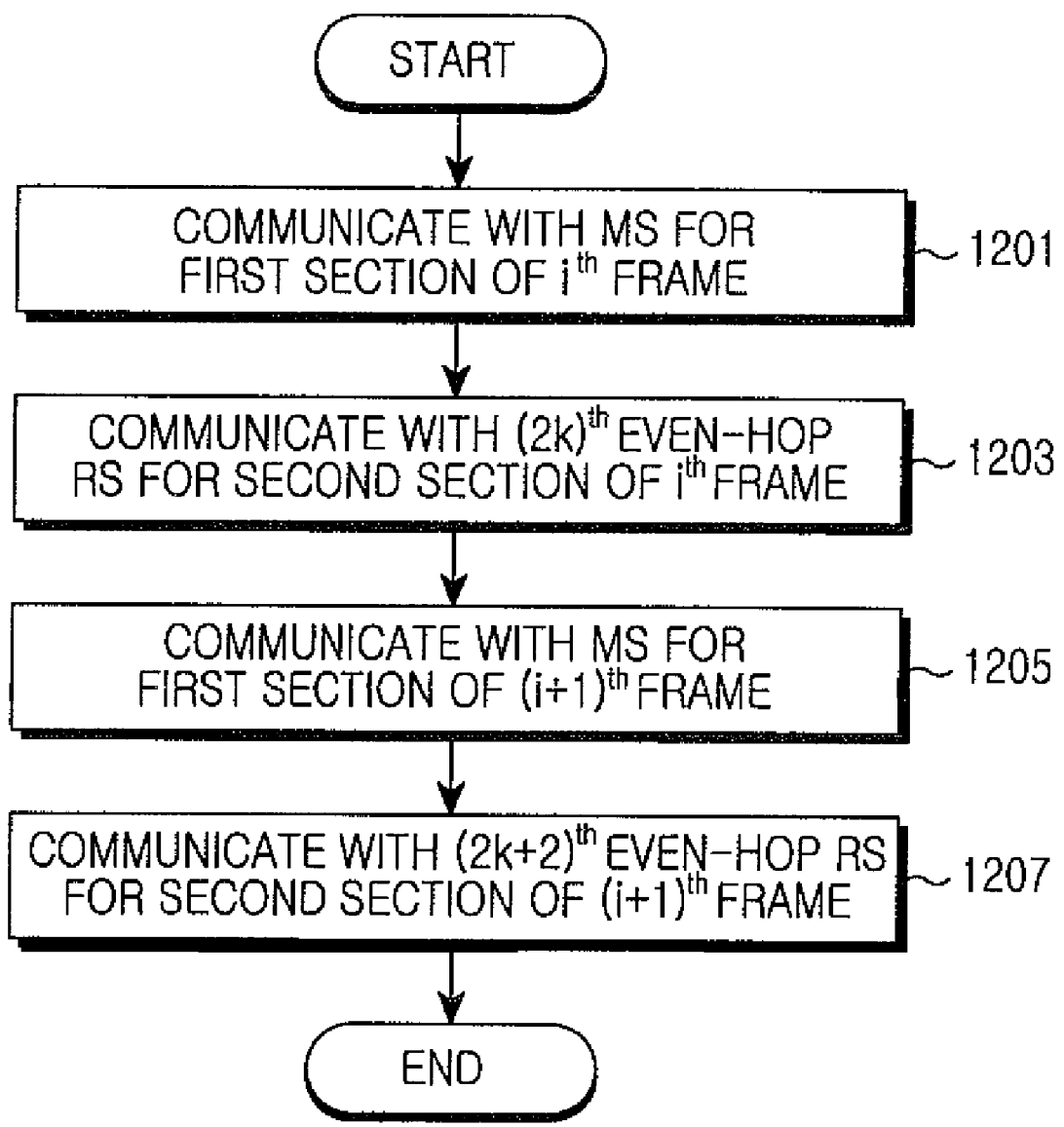
FIG. 12 is a flowchart illustrating an operation of an odd-hop RS in the multi-hop relay BWA communication system according to an embodiment of the present invention.

FIG. 12 is a flowchart illustrating an operation of an odd-hop RS in the multi-hop relay BWA communication system according to an embodiment of the present invention. In the following description, it is assumed that the odd-hop RS receives resource allocation information from the BS.

Referring to FIG. 12, in step 1201, the odd-hop RS communicates with MSs within its coverage area for the first section of the $i^{th}$ frame.

Thereafter, in step 1203, the odd-hop RS communicates with the previous even-hop RS for the second section of the $i^{th}$ frame. That is, the $(2k+1)^{th}$ odd-hop RS communicates with the $(2k)^{th}$ even-hop RS for the second section of the $i^{th}$ frame.

For example, the odd-hop RS transmits DL data to the MS for the first section of the DL subframe in the $i^{th}$ frame, and receives DL data from the previous even-hop RS for the second section. Also, the odd-hop RS receives UL data from the MS for the first section of the UL subframe in the $i^{th}$ frame, and transmits UL data to the previous even-hop RS for the second section.

In step 1205, the odd-hop RS communicates with MSs within its coverage area for the first section of the $(i+1)^{th}$ frame.

Thereafter, in step 1207, the odd-hop RS communicates with the next even-hop RS for the second section of the $(i+1)^{th}$ frame. That is, the $(2k+1)^{th}$ odd-hop RS communicates with the $(2k+2)^{th}$ even-hop RS for the second section.

For example, the odd-hop RS transmits DL data to the MS for the first section of the DL subframe in the $(i+1)^{th}$ frame, and transmits DL data to the next even-hop RS for the second section. Also, the odd-hop RS receives UL data from the MS for the first section of the UL subframe in the $(i+1)^{th}$ frame, and receives UL data from the next even-hop RS for the second section.

Thereafter, the odd-hop RS ends the operation.

Figure 13:
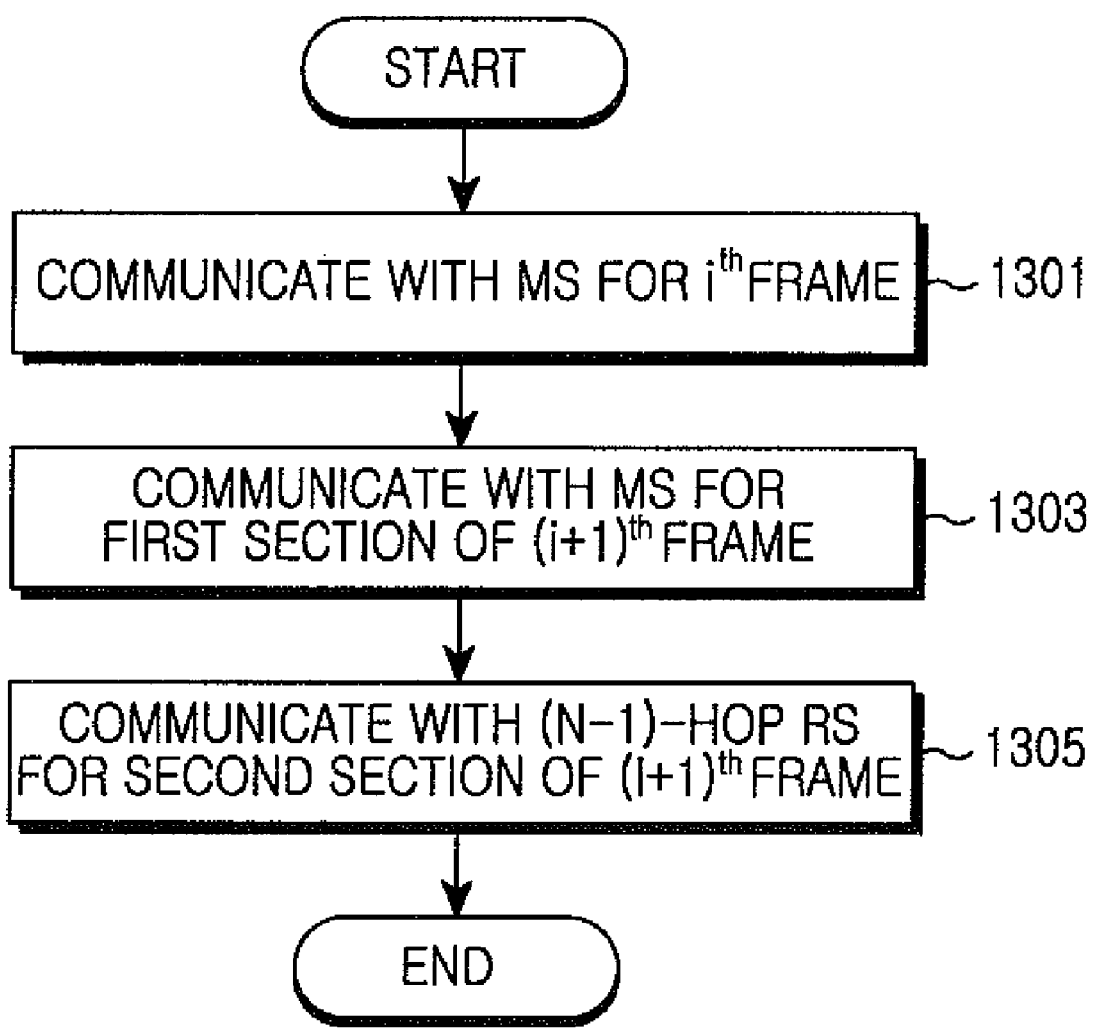
FIG. 13 is a flowchart illustrating an operation of a terminal RS in the multi-hop relay BWA communication system according to an embodiment of the present invention.

FIG. 13 is a flowchart illustrating an operation of a terminal RS in the multi-hop relay BWA communication system according to an embodiment of the present invention. Herein, the terminal RS denotes a terminal even-hop RS. In the following description, it is assumed that the terminal RS receives resource allocation information from the BS.

Referring to FIG. 13, in step 1301, the terminal RS communicates with MSs within its coverage area for the $i^{th}$ frame. For example, the terminal RS transmits DL data to the MS for the DL subframe of the $i^{th}$ frame. Also, the terminal RS receives UL data from the MS for the UL subframe of the $i^{th}$ frame.

In step 1303, the terminal RS communicates with MSs within its coverage area for the first section of the $(i+1)^{th}$ frame.

Thereafter, in step 1305, the terminal RS communicates with the previous-hop RS for the second section of the $(i+1)^{th}$ frame. That is, the terminal N-hop RS communicates with the (N−1)-hop RS for the second section.

For example, the terminal RS transmits DL data to the MS for the first section of the DL subframe in the $(i+1)^{th}$ frame, and receives DL data from the previous-hop RS for the second section. Also, the terminal RS receives UL data from the MS for the first section of the UL subframe in the $(i+1)^{th}$ frame, and transmits UL data to the previous-hop RS for the second section.

Thereafter, the terminal RS ends the operation.

If the terminal RS is an odd-hop RS, the terminal odd-hop RS operates in such a way as to interchange the $i^{th}$ frame and the $(i+1)^{th}$ frame of the terminal even-hop RS. That is, the terminal odd-hop RS transmits DL data to the MS for the first section of the DL subframe in the $i^{th}$ frame, and receives DL data from the previous-hop RS for the second section. Also, the terminal odd-hop RS receives UL data from the MS for the first section of the UL subframe in the $(i+1)^{th}$ frame, and transmits UL data to the previous-hop RS for the second section.

Also the terminal odd-hop RS transmits DL data to the MS for the DL subframe of the $(i+1)^{th}$ frame, and receives UL data from the MS for the UL subframe of the $(i+1)^{th}$ frame.

Figure 14:
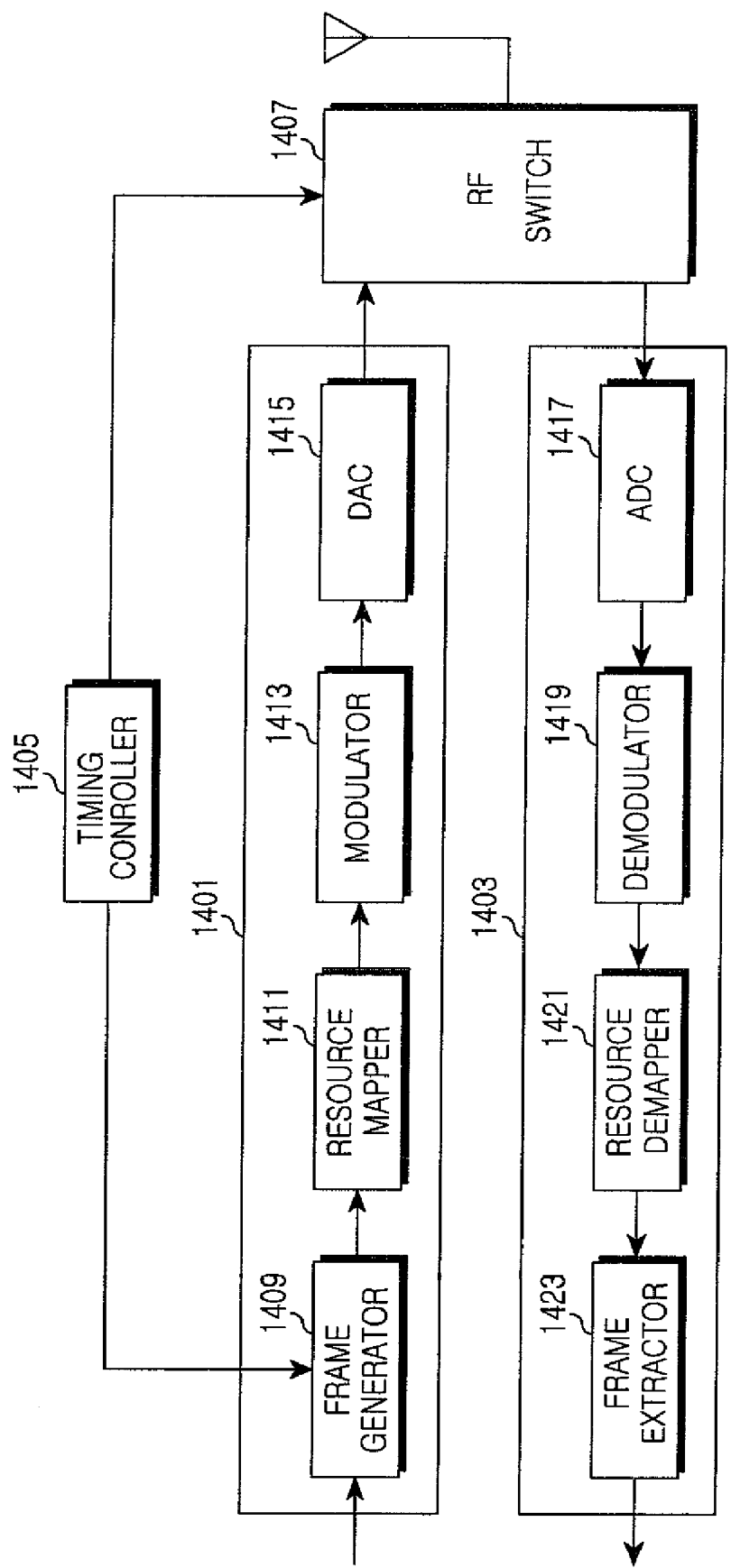
FIG. 14 is a block diagram of an RS in the multi-hop relay BWA communication system according to an embodiment of the present invention.

In order to provide a multi-hop relay service using the frame structure described above, the RS is configured as illustrated in FIG. 14. The BS, the even-hop RS, the odd-hop RS, the terminal even-hop RS, and the terminal odd-hop RS are identical in configuration and thus only the RS will be described with reference to FIG. 14.

FIG. 14 is a block diagram of an RS in the multi-hop relay BWA communication system according to an embodiment of the present invention.

Referring to FIG. 14, the RS includes a transmitter 1401, a receiver 1403, a timing controller 1405, and an RF switch 1407.

The transmitter 1401 includes a frame generator 1409, a resource mapper 1411, a modulator 1413, and a digital-to-analog converter (DAC) 1415.

According to a control signal from the timing controller 1405, the frame generator 1409 generates subframes of first and second sections as a subframe structure illustrated in FIG. 4 or 7. For example, the frame generator 1409 of an even-hop RS generates an RS-MS link subframe for the first section of the $i^{th}$ frame, and generates a subframe for a link between the RS and the next odd-hop RS for the second section of the $i^{th}$ frame. Also, the frame generator 1409 of the even-hop RS generates an RS-MS link subframe for the first section of the $(i+1)^{th}$ frame, and generates a subframe for a link between the RS and the previous odd-hop RS for the second section of the $(i+1)^{th}$ frame.

At this point, the frame generator 1409 generates a sync channel for the MS at the front of the first section, and generates a sync channel or the RS at the front or rear of the second section.

The resource mapper 1411 allocates the subframes to bursts of the links corresponding to the subframes.

The modulator 1413 modulates the subframes received from the resource mapper 1411 in accordance with a predetermined modulation level (e.g., a Modulation and Coding Scheme (MCS) level).

The DAC 1415 converts the modulated digital signal into an analog signal and outputs the resulting analog signal to the RF switch 1407.

The receiver 1403 includes an analog-to-digital converter (ADC) 1417, a demodulator 1419, a resource demapper 1421, and a frame extractor 1423.

The ADC 1417 converts an analog signal received from the RF switch 1407 into a digital signal. The demodulator 1419 demodulates the digital signal from the ADC 1417 in accordance with a predetermined modulation level (e.g., an MCS level).

The resource demapper 1421 extracts subframes from bursts of each link received from the demodulator 1419.

The frame extractor 1423 extracts the subframe for the RS from the subframes received from the resource demapper 1421.

Under the control of the timing controller 1405, the RF switch 1407 switches signals, which are transmitted/received to/from the BS, the MSs, and another RS, to the transmitter 1401 and the receiver 1403.

The timing controller 1405 generates a control signal for transmitting/receiving the subframes illustrated in FIG. 4 or 7 in the timings illustrated in FIG. 5 or 8.

The above embodiment has been described in the context of the even-hop RS. In the case of a BS, the frame generator 1409 generates a subframe for a link between the BS and an MS for the first section of the $i^{th}$ frame, and generates a subframe for a link between the BS and a 1-hop RS for the second section of the $i^{th}$ frame. Also, the frame generator 1409 generates a subframe for a link between the BS and the MS for the first section of the $(i+1)^{th}$ frame.

In the case of an odd-hop RS, the frame generator 1409 generates a subframe for a link between the RS and an MS for the first section of the $i^{th}$ frame, and generates a subframe for a link between the RS and the previous even-hop RS for the second section of the $i^{th}$ frame. Also, the frame generator 1409 generates a subframe for a link between the RS and the MS for the first section of the $(i+1)^{th}$ frame, and generates a subframe for a link between the RS and the next even-hop RS for the second section of the $(i+1)^{th}$ frame.

In the case of a terminal even-hop RS, the frame generator 1409 generates a subframe for a link between the RS and an MS for the $i^{th}$ frame. Also, the frame generator 1409 generates a subframe for a link between the RS and the MS for the first section of the $(i+1)^{th}$ frame, and generates a subframe for a link between the RS and the previous-hop RS for the second section of the $(i+1)^{th}$ frame. In this case, the BS and the odd-hop RSs generate a sync channel in the same way as the even-hop RS.

In the case of a terminal odd-hop RS, the frame generator 1409 generates a subframe for a link between the RS and an MS for the first section of the $i^{th}$ frame, and generates a link between the RS and the previous-hop RS for the second section of the $i^{th}$ frame. Also, the frame generator 1409 generates a subframe for a link between the RS and the MS for the $(i+1)^{th}$ frame.

Figure 25:
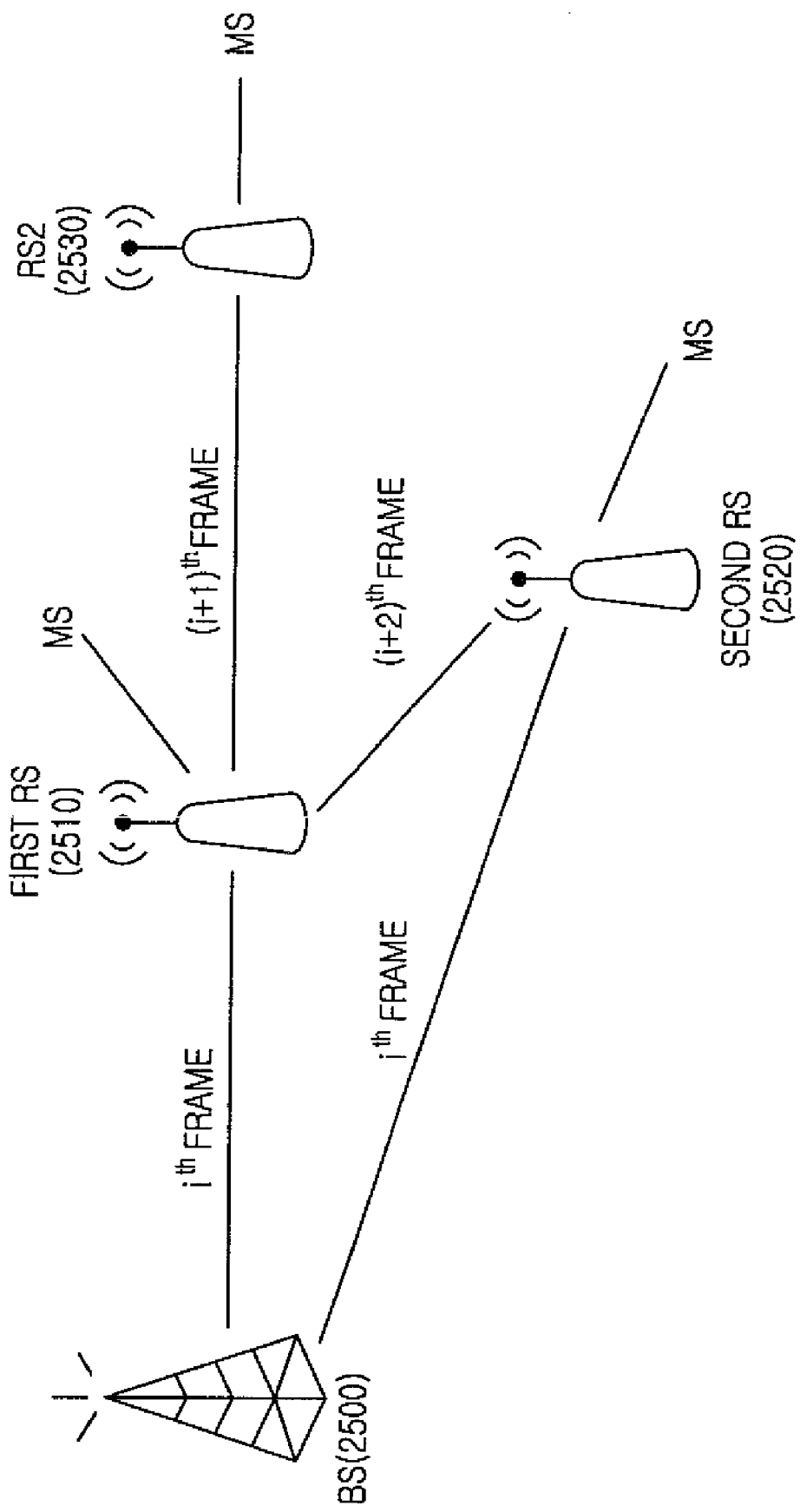
FIG. 25 is a diagram illustrating the configuration of a multi-hop relay BWA communication system according to another embodiment of the present invention.

Although a description has been made of the methods for performing communications between the BS, the even-hop RS, the odd-hop RS, and the MS, the communication system can also perform communications between RSs of the same hop, as illustrated in FIG. 25.

FIG. 25 is a diagram illustrating the configuration of a multi-hop relay BWA communication system according to another embodiment of the present invention.

Referring to FIG. 25, a BS 2500 communicates with an MS within its coverage area via a direct link. The BS 2500 communicates with an MS 2510/2520/2530, which is located outside the coverage area of the BS 2500 and thus is in poor channel condition, via an RS 2510/2520/2530.

The RSs 2510, 2520 and 2530 relay services from the BS 2500 to the MSs using a plurality of relay links. For example, the first RS 2510 connects a communication link between the BS 2500 and an MS within its coverage area. Also, the first RS 2510 connects a communication link between the BS 2500 and the RS 2530 (RS2).

There may be a plurality of RSs connected in a 1-hop fashion to the BS 2500. For example, the BS 2500 provides a service through a direct link to the first RS 2510 and the second RS 2520 that are connected in a 1-hop fashion to the BS 2500. If the second RS 2520 is in poor channel condition, the first RS 2510 can relay a signal from the BS 2500 to the second RS 2520.

As described above, the communication system can perform communications between the RSs of the same hop. In this case, for the communications between the RSs of the same hop, the even-hop RS and the odd-hop RS may operate as illustrated in FIG. 26 or 27.

Figure 26:
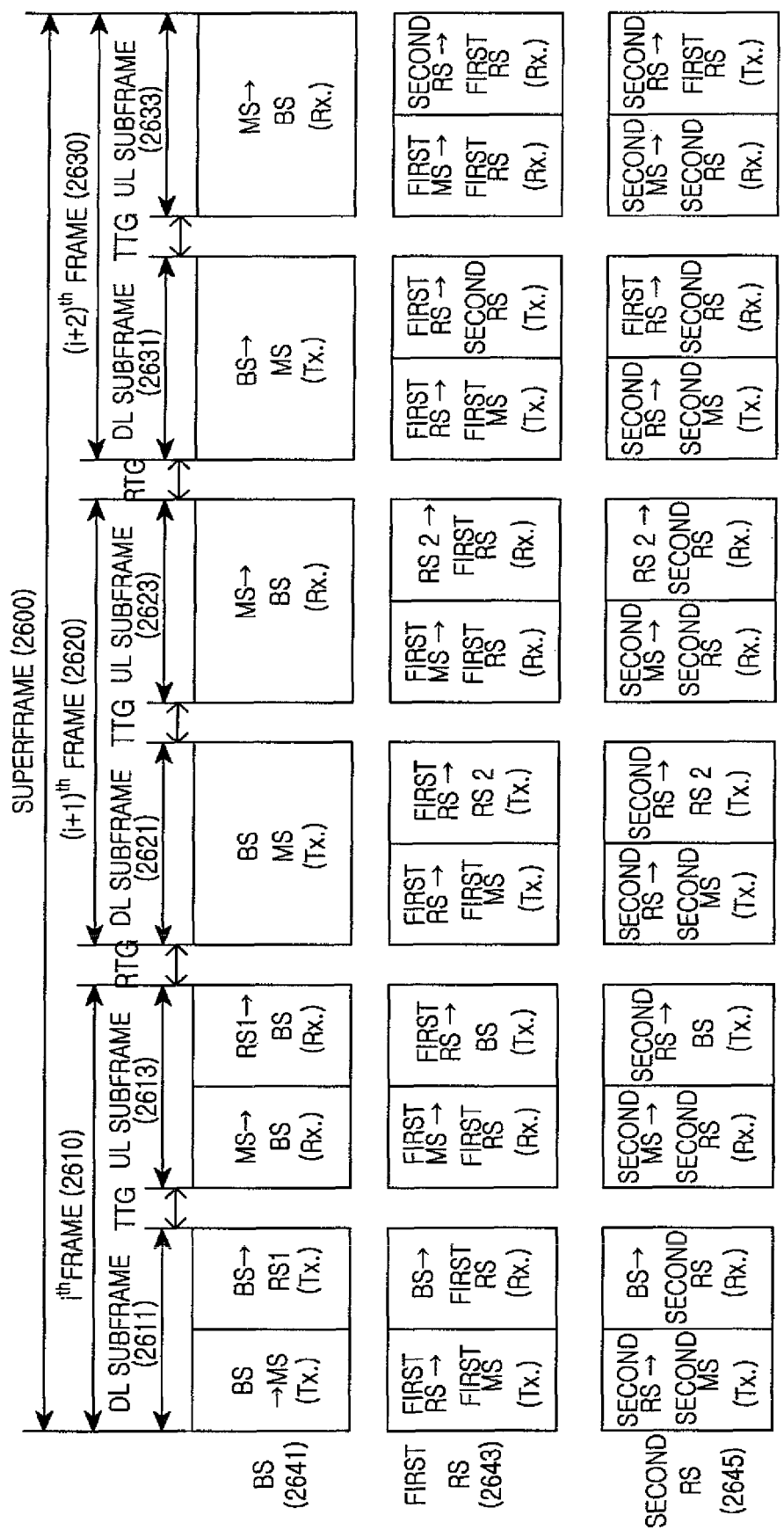
FIG. 26 is a diagram illustrating a frame structure for the multi-hop relay BWA communication system according to another embodiment of the present invention.
Figure 27:
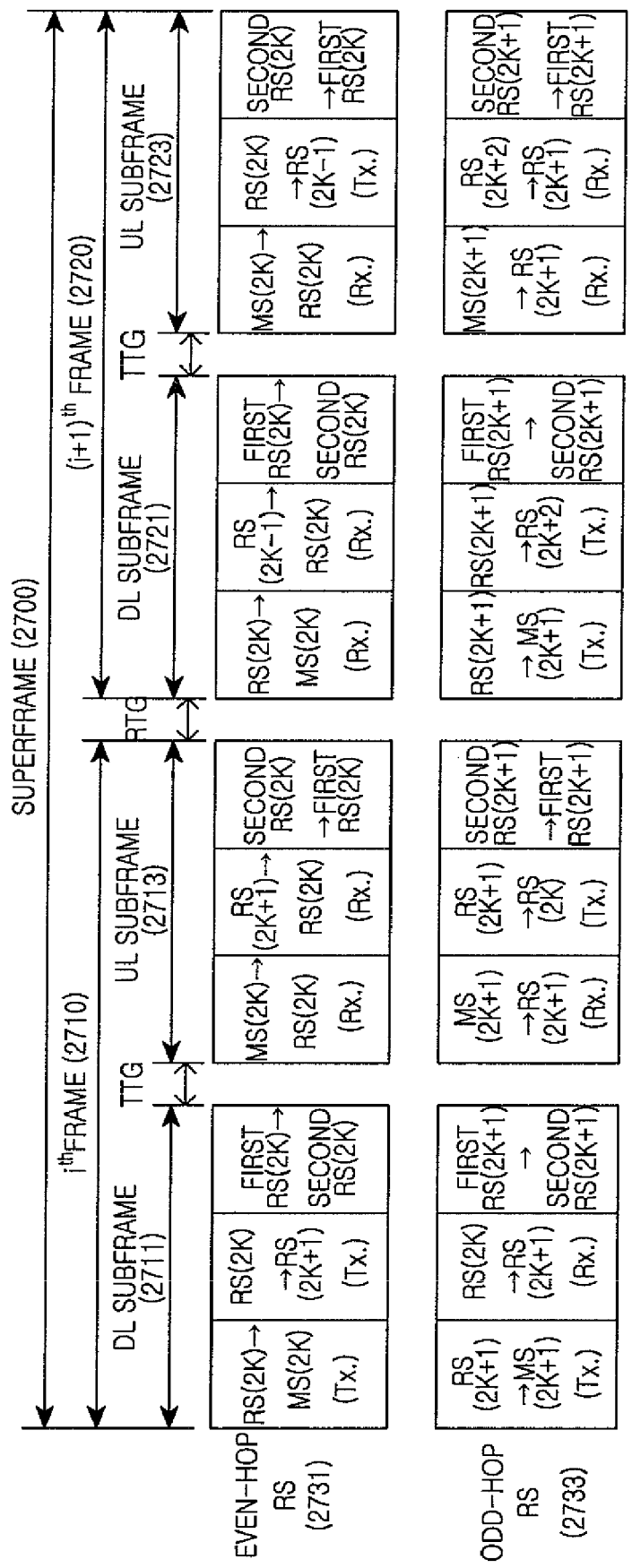
FIG. 27 is a diagram illustrating a frame structure for the multi-hop relay BWA communication system according to still another embodiment of the present invention.

FIG. 26 is a diagram illustrating a frame structure for the multi-hop relay BWA communication system according to another embodiment of the present invention. The following description is made taking the first and second RSs 2510 and 2520 (1-hop RSs) as an example of the odd-hop RSs.

Referring to FIG. 26, a superframe 2600 is configured using 3 frames to provide communications between an even-hop RS and an odd-hop RS and communications between RSs of the same hop.

The $i^{th}/(i+1)^{th}/(i+2)^{th}$ frames 2610/2620/2630 of the superframe 2600 are divided into DL subframes 2611/2621/2631 and UL subframes 2613/2623/2633 in accordance with a TDD scheme. Each of the DL subframes 2611/2621/2631 and the UL subframes 2613/2623/2633 are divided into a first section and a second section.

A guard interval of a TTG exists between the DL subframes 2611/2621/2631 and the UL subframes 2613/2623/2633, and a guard interval of an RTG exists between the $i^{th}$ frame 2610, the $(i+1)^{th}$ frame 2620, and the $(i+2)^{th}$ frame 2630.

If a relay service is provided using the superframe 2600, a BS 2641 transmits DL data to an MS within its coverage area for the first section of the DL subframe 2611 in the $i^{th}$ frame 2610. Thereafter, the BS 2641 transmits DL data to a first RS 2643 and a second RS 2645 for the second section of the DL subframe 2611.

The BS 2641 receives UL data from the MS for the first section of the UL subframe 2613, and receives UL data from the first RS 2643 and the second RS 2645 for the second section of the UL subframe 2613. If the $i^{th}$ frame 2610 is the same as that in the IEEE 802.16 standards, the BS 2641 may perform communications using the $i^{th}$ frame illustrated in FIG. 15.

Figure 16:
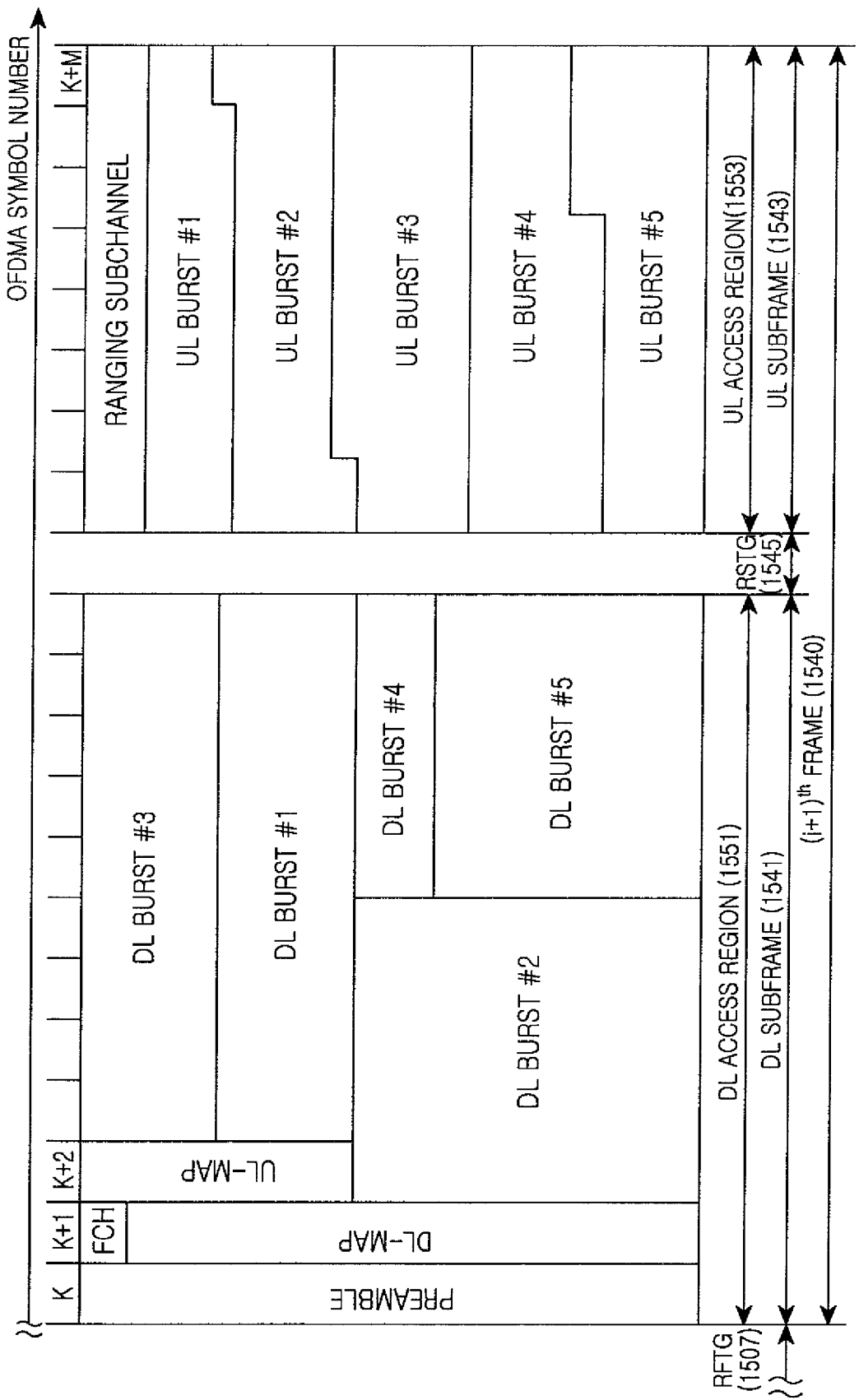
FIG. 16 is a diagram illustrating an $(i+1)^{th}$ frame structure for a BS in the multi-hop relay BWA communication system according to an embodiment of the present invention.

The BS 2641 transmits DL data to the MS for the DL subframes 2621/2631 of the $(i+1)^{th}/(i+2)^{th}$ frames 2620/2630, and receives UL data from the MS for the UL subframes 2623/2633 of the $(i+1)^{th}/(i+2)^{th}$ frames 2620/2630. If the $(i+1)^{th}$ and $(i+2)^{th}$ frames 2620 and 2630 are the same as those in the IEEE 802.16 standards, the BS 2641 may perform communications using the $(i+1)^{th}$ and $(i+2)^{th}$ frames as illustrated in FIG. 16.

The first RS 2643 transmits DL data to a first MS within its coverage area for the first section of the DL subframe 2611 in the $i^{th}$ frame 2610, and receives DL data from the BS 2641 for the second section of the DL subframe 2611.

The first RS 2643 receives UL data from the first MS for the first section of the UL subframe 2613, and transmits UL data to the BS 2641 for the second section of the UL subframe 2613.

The first RS 2643 transmits DL data to the first MS for the first section of the DL subframe 2621 in the $(i+1)^{th}$ frame 2620, and transmits DL data to a 2-hop RS for the second section of the DL subframe 2621. That is, the first RS 2643 transmits the DL data, which have been received from the BS 2641 for the $i^{th}$ frame 2610, to the 2-hop RS for the second section of the DL subframe 2621.

The first RS 2643 receives UL data from the first MS for the first section of the UL subframe 2623, and receives UL data from the 2-hop RS for the second section of the UL subframe 2623.

The first RS 2643 transmits DL data to the first MS for the first section of the DL subframe 2631 in the $(i+2)^{th}$ frame 2630, and transmits DL data to the second RS 2645 for the second section of the DL subframe 2631. That is, the first RS 2643 transmits the DL data, which have been received from the BS 2641 for the $i^{th}$ frame 2610, to the second RS 2645 for the second section of the DL subframe 2631.

The first RS 2643 receives UL data from the first MS for the first section of the UL subframe 2633, and receives UL data from the second RS 2645 for the second section of the UL subframe 2633.

The second RS 2645 transmits DL data to a second MS within its coverage area for the first section of the DL subframe 2611 in the i$^{th}$ frame 2610, and receives DL data from the BS 2641 for the second section of the DL subframe 2611.

The second RS 2645 receives UL data from the second MS for the first section of the UL subframe 2613, and transmits UL data to the BS 2641 for the second section of the UL subframe 2613.

The second RS 2645 transmits DL data to the second MS for the first section of the DL subframe 2621 in the (i+1)$^{th}$ frame 2620, and transmits DL data to a 2-hop RS for the second section of the DL subframe 2621. That is, the second RS 2645 transmits the DL data, which has been received from the BS 2641 for the i$^{th}$ frame 2610, to the 2-hop RS for the second section of the DL subframe 2621.

The second RS 2645 receives UL data from the second MS for the first section of the UL subframe 2623, and receives UL data from the 2-hop RS for the second section of the UL subframe 2623.

The second RS 2645 transmits DL data to the second MS for the first section of the DL subframe 2631 in the (i+2)$^{th}$ frame 2630, and receives DL data from the first RS 2643 for the second section of the DL subframe 2631.

The second RS 2645 receives UL data from the second MS for the first section of the UL subframe 2633, and transmits UL data to the first RS 2643 for the second section of the UL subframe 2633.

As described above, the even-hop RS and the odd-hop RS communicates with the RSs of the same hop using the second section of the (i+2)$^{th}$ frame illustrated in FIG. 26.

At this point, the frame generator of the BS, the even-hop RS and the odd-hop RS generates the (i+2)$^{th}$ frame. For example, in the case of the BS, the frame generator 1409 generates a subframe for a link between the BS and an MS for the (i+$_2$)$^{th}$ frame.

In the case of the even-hop RS, the frame generator 1409 generates a subframe for a link between the RS and an MS for the first section in the (i+2)$^{th}$ frame, and generates a subframe for a link between the RS and another even-hop RS of the same hop for the second section in the (i+2)$^{th}$ frame.

In the case of the odd-hop RS, the frame generator 1409 generates a subframe for a link between the RS and an MS for the first section in the (i+2)$^{th}$ frame, and generates a subframe for a link between the RS and another odd-hop RS of the same hop for the second section in the (i+2)$^{th}$ frame.

FIG. 27 is a diagram illustrating a frame structure for the multi-hop relay BWA communication system according to still another embodiment of the present invention.

Referring to FIG. 27, a superframe 2700 is configured using 2 frames to provide communications between an even-hop RS and an odd-hop RS and communications between RSs of the same hop.

The i$^{th}$/(i+1)$^{th}$ frames 2710/2720 of the superframe 2700 is divided into DL subframes 2711/2721 and UL subframes 2713/2723 in accordance with a TDD scheme. Each of the DL subframes 2711/2721 and the UL subframes 2713/2723 is divided into a first section, a second section, and a third section.

A guard interval of a TTG exists between the DL subframes 2711/2721 and the UL subframes 2713/2723, and a guard interval of an RTG exists between the i$^{th}$ frame 2710 and the (i+1)$^{th}$ frame 2720.

If a relay service is provided using the superframe 2700, an even-hop RS 2731 transmits DL data to an MS within its coverage area for the first section of the DL subframe 2711 in the i$^{th}$ frame 2710. Also, the even-hop RS 2731 transmits DL data to the next odd-hop RS 2733 for the second section of the DL subframe 2711. For example, the (2k)$^{th}$ even-hop RS 2731 transmits DL data to the (2k+1)$^{th}$ odd-hop RS 2733 for the second section of the DL subframe 2711, where 'k' is 0 to N/2 (N: the total number of hops).

Also, the even-hop RS 2731 transmits DL data to another even-hop RS of the same hop for the third section of the DL subframe 2711.

The even-lop RS 2731 receives UL data from the MS for the first section of the UL subframe 2713 in the i$^{th}$ frame 2710, and receives UL data from the next odd-hop RS 2739 for the second section of the UL subframe 2713. For example, the (2k)$^{th}$ even-hop RS 2731 receives UL data from the (2k+1)$^{th}$ odd-hop RS 2733 for the second section of the DL subframe 2713.

Also, the even-hop RS 2731 receives UL data from another even-hop RS of the same hop for the third section of the UL subframe 2713.

The even-hop RS 2731 transmits DL data to the MS for the first section of the DL subframe 2721 in the (i+1)$^{th}$ frame 2720, and receives DL data from the previous odd-hop RS for the second section of the DL subframe 2721. For example, the (2k)$^{th}$ even-hop RS 2731 receives DL data from the (2k−1)$^{th}$ odd-hop RS for the second section of the DL subframe 2721.

Also, the even-hop RS 2731 transmits DL data to another even-hop RS of the same hop for the third section of the DL subframe 2721.

The even-hop RS 2731 receives UL data from the MS for the first section of the UL subframe 2723 in the (i+1)$^{th}$ frame 2720, and transmits UL data to the previous odd-hop RS for the second section of the UL subframe 2723. For example, the (2k)$^{th}$ even-hop RS 2731 transmits UL data to the (2k−1)$^{th}$ odd-hop RS for the second section of the UL subframe 2723.

Also, the even-hop RS 2731 receives UL data from another even-hop RS of the same hop for the third section of the UL subframe 2723.

The odd-hop RS 2733 transmits DL data to an MS within its coverage area for the first section of the DL subframe 2711 in the i$^{th}$ frame 2710. Also, the odd-hop RS 2733 receives DL data from the previous even-hop RS 2731 for the second section of the DL subframe 2711. For example, the (2k+1)$^{th}$ odd-hop RS 2733 receives DL data from the (2k)$^{th}$ even-hop RS 2731 for the second section of the DL subframe 2711.

Also, the odd-hop RS 2733 transmits DL data to another odd-hop RS of the same hop for the third section of the DL subframe 2711.

The odd-hop RS 2733 receives UL data from the MS for the first section of the UL subframe 2713 in the i$^{th}$ frame 2710, and transmits UL data to the previous even-hop RS 2731 for the second section of the UL subframe 2713. For example, the (2k+1)$^{th}$ odd-hop RS 2733 transmits UL data to the (2k)$^{th}$ even-hop RS 2731 for the second section of the UL subframe 2713.

Also, the odd-hop RS 2733 receives UL data from another odd-hop RS of the same hop for the third section of the UL subframe 2713.

The odd-hop RS 2733 transmits DL data to the MS for the first section of the DL subframe 2721 in the (i+1)$^{th}$ frame 2720, and transmits DL data to the next even-hop RS for the second section of the DL subframe 2721. For example, the (2k+1)$^{th}$ odd-hop RS 2733 transmits DL data to the (2k+2)$^{th}$ even-hop RS for the second section of the DL subframe 2721.

Also, the odd-hop RS 2733 transmits DL data to another odd-hop RS of the same hop for the third section of the DL subframe 2721.

The odd-hop RS 2733 receives UL data from the MS for the first section of the UL subframe 2723 in the (i+1)$^{th}$ frame 2720, and receives UL data from the next even-hop RS for the second section of the UL subframe 2723. For example, the (2k+1)$^{th}$ odd-hop RS 2733 receives UL data from the (2k+2)$^{th}$ even-hop RS for the second section of the UL subframe 2723.

Also, the odd-hop RS 2733 receives UL data from another odd-hop RS of the same hop for the third section of the UL subframe 2723.

As described above, the even-hop RS and the odd-hop RS can communicate with RSs of the same hop using the third sections of the i$^{th}$ and (i+1)$^{th}$ frames illustrated in FIG. 27.

Thus, the frame generator of the even-hop RS and the odd-hop RS generates the i$^{th}$ frame and the (i+1)$^{th}$ frame, as illustrated FIG. 27.

For example, in the case of the even-hop RS, the frame generator 1409 generates a subframe for a link between the RS and an MS for the first section in the i$^{th}$ frame, generates a subframe for a link between the RS and the next odd-hop RS for the second section, and generates a subframe for a link between the RS and another even-hop RS of the same hop for the third section.

Also, the frame generator 1409 generates a subframe for a link between the RS and an MS for the first section in the (i+1)$^{th}$ frame, generates a subframe for a link between the RS and the previous odd-hop RS for the second section, and generates a subframe for a link between the RS and another even-hop RS of the same hop for the third section.

In the case of the odd-hop RS, the frame generator 1409 generates a subframe for a link between the RS and an MS for the first section in the i$^{th}$ frame, generates a subframe for a link between the RS and the previous even-hop RS for the second section, and generates a subframe for a link between the RS and another odd-hop RS of the same hop for the third section.

Also, the frame generator 1409 generates a subframe for a link between the RS and an MS for the first section in the (i+1)$^{th}$ frame, generates a subframe for a link between the RS and the next even-hop RS for the second section, and generates a subframe for a link between the RS and another odd-hop RS of the same hop for the third section.

Although a description has been made of the even-hop RS and the odd-hop RS for communication between the RSs of the same hop, it is to be clearly understood that the present invention can be similarly applied to the terminal hop RS.

According to the present invention as described above, a synchronized synch channel and service are provided to the MSs and the RSs in the multi-hop relay BWA communication system using the two consecutive frames. Therefore, a handover according to the MS mobility and a cell search for synchronization can be facilitated. Also, the RSs can be easily synchronized using the synchronized sync channel.

While the invention has been shown and described with reference to certain preferred embodiments thereof it will be understood by those skilled in the art that various changes in form and details may be made therein without departing from the spirit and scope of the invention as defined by the appended claims.

What is claimed is:

1. A method for configuring a superframe for providing a relay service in a wireless communication system, comprising the steps of:
   configuring the superframe having an ith frame and an (i+1)th frame, wherein the ith frame and (i+1)th frame are each divided into first and second subframes;
   configuring, by an odd-hop Relay Station (RS), a first resource allocation region of a first section of the first and second subframes of the ith frame and a first section of the first and second subframes of the (i+1)th frame for communication between the odd-hop RS and a first Mobile Station (MS) within a coverage area of the odd-hop RS;
   configuring, by the odd-hop RS, a second resource allocation region of a second section of the first and second subframes of the (i+1)th frame for communication between the odd-hop RS and an even-hop RS of the wireless communication system;
   configuring, by the even-hop RS, a third resource allocation region of the first section of the first and second subframes of the ith and (i+1)th frames for communication between the even-hop RS and a second MS that is within the coverage area of the even-hop RS; and
   configuring, by the even-hop RS, a fourth resource allocation region of a second section of the first and second subframes of the (i)th frame for communication between the even-hop RS and a next odd-hop RS.

2. The method of claim 1, wherein the first section and the second section of each subframe are divided in time.

3. The method of claim 1, wherein the resource allocation regions of the first section and the second section of the subframes are multiplexed using one of a Space Division Multiplexing (SDM) scheme, a Frequency Division Multiplexing (FDM) scheme, and an Orthogonal Frequency Division Multiple Access (OFDMA) scheme.

4. The method of claim 1, wherein the first resource allocation region and the third resource allocation region of the first section have an MS sync channel at a front end thereof.

5. The method of claim 1, wherein the second resource allocation region and the fourth resource allocation region of the second section have an RS sync channel at a front or rear end thereof.

6. The method of claim 5, wherein the second resource allocation region and the fourth resource allocation region of the second section have the RS sync channel at a front or rear end of the second section of each subframe when the first section and the second section are fixed in size.

7. The method of claim 5, wherein the second resource allocation region and the fourth resource allocation region of the second section have the RS sync channel at a rear end of the second section of each subframe when the first section and the second section are variable in size.

8. The method of claim 1, wherein the second resource allocation region and the fourth resource allocation region of the second section have control information at a rear end thereof.

9. The method of claim 1, wherein the second sections of the subframes of the i$^{th}$ frame and the (i+1)$^{th}$ frame schedule the respective resource allocation regions using different radio resources.

10. The method of claim 1, wherein the second sections of the subframes of the i$^{th}$ frame and the (i+1)$^{th}$ frame allocate different subchannels or subcarriers to the respective resource allocation regions.

11. The method of claim 1, further comprising:
    configuring, by the odd-hop RS, a fifth resource allocation region of the second section of the first and second subframes of the (i+1)th frame for communication between the odd-hop RS and the first MS; and
    configuring, by the even-hop RS, a sixth resource allocation region of the second section of the first and second subframes of the ith frame for communication between the even-hop RS and the second MS.

12. The method of claim 1, further comprising:
    configuring, by at least one of the odd-hop RS and the even-hop RS, a seventh resource allocation region of a third section of the first and second subframes of the ith and (i+1)th frames for communication between the at least one of the odd-hop RS and the even-hop RS.

13. The method of claim 1, further comprising:

configuring, by the BS, first and second subframes of an (i+2)th frame for communication between the BS and the MS;

configuring, by the odd-hop RS, an eighth resource allocation region of a first section of the first and second subframes of the (i+2)th frames for communication between the odd-hop RS and the first MS;

configuring, by the odd-hop RS, a ninth resource allocation region of a second section of the first and second subframes of the (i+2)th frame for communication between the odd-hop RS and the even-hop RS; and configuring, by the even-hop RS, a tenth resource allocation region of the first section of the first and second subframes of the (i+2)th frame for communication between the even-hop RS and the second MS.

14. The method of claim 1, further comprising:

configuring, by a Base Station (BS) of the wireless communication system, a eleventh resource allocation region of the first section of the first and second subframes of the ith frame and the first and second subframes of the (i+1)th frame for communication between the BS and a third MS within a coverage area of the BS; and configuring, by the BS, a twelfth resource allocation region of the second section of the first and second subframes of the ith frame for communication between the BS and the odd-hop RS of the wireless communication system.

\* \* \* \* \*